US012108242B2

(12) United States Patent
Tsuchida

(10) Patent No.: US 12,108,242 B2
(45) Date of Patent: Oct. 1, 2024

(54) SIGNAL PROCESSING DEVICE AND SIGNAL PROCESSING METHOD

(71) Applicant: SONY GROUP CORPORATION, Tokyo (JP)

(72) Inventor: Yuji Tsuchida, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 117 days.

(21) Appl. No.: 17/778,621

(22) PCT Filed: Nov. 13, 2020

(86) PCT No.: PCT/JP2020/042377

§ 371 (c)(1),
(2) Date: May 20, 2022

(87) PCT Pub. No.: WO2021/106613

PCT Pub. Date: Jun. 3, 2021

(65) Prior Publication Data

US 2023/0007430 A1 Jan. 5, 2023

(30) Foreign Application Priority Data

Nov. 29, 2019 (JP) ................................ 2019-216096

(51) Int. Cl.
*H04S 7/00* (2006.01)

(52) U.S. Cl.
CPC .............. *H04S 7/304* (2013.01); *H04S 7/307* (2013.01)

(58) Field of Classification Search
CPC ....... H04S 7/304; H04S 7/307; H04S 2420/01
USPC .................................. 381/1, 17, 18, 303, 26
See application file for complete search history.

(56) References Cited

U.S. PATENT DOCUMENTS

| | | | | |
|---|---|---|---|---|
| 10,187,740 | B2 * | 1/2019 | Family | H04R 5/033 |
| 11,070,930 | B2 * | 7/2021 | Milne | G06F 3/0488 |
| 11,172,320 | B1 * | 11/2021 | Pelzer | G06T 15/06 |
| 11,330,371 | B2 * | 5/2022 | Carlsson | H04S 7/307 |
| 11,417,347 | B2 * | 8/2022 | Johnson | H04S 7/304 |
| 2016/0212564 | A1 * | 7/2016 | Fontana | H04S 3/004 |
| 2016/0337779 | A1 * | 11/2016 | Davidson | H04S 7/304 |
| 2017/0078820 | A1 | 3/2017 | Brandenburg et al. | |

FOREIGN PATENT DOCUMENTS

| | | | |
|---|---|---|---|
| JP | 2015-130550 | A | 7/2015 |
| JP | 2017-522771 | A | 8/2017 |
| JP | 2019-028368 | A | 2/2019 |

OTHER PUBLICATIONS

International Search Report and Written Opinion of PCT Application No. PCT/JP2020/042377, issued on Feb. 16, 2021, 08 pages of ISRWO.

* cited by examiner

*Primary Examiner* — Xu Mei
(74) *Attorney, Agent, or Firm* — CHIP LAW GROUP

(57) ABSTRACT

There is provided a signal processing device that includes a relative azimuth prediction unit that predicts, on the basis of a delay time in accordance with a distance from a virtual sound source to a listener, a relative azimuth of the virtual sound source when a sound of the virtual sound source reaches the listener, and a binaural-room impulse response (BRIR) generation unit that acquires a head-related transfer function of the relative azimuth for each one of a plurality of the virtual sound sources and generates a BRIR on the basis of a plurality of the acquired head-related transfer functions.

10 Claims, 13 Drawing Sheets

SIGNAL PROCESSING DEVICE AND SIGNAL PROCESSING METHOD

TECHNICAL FIELD

The present technology relates to a signal processing device, a signal processing method, and a program, and more particularly, to a signal processing device, a signal processing method, and a program that allow for prevention of distortion of a sound space.

BACKGROUND ART

For example, in virtual reality (VR) or augmented reality (AR) using a head-mounted display, not only video but also sound is binaurally reproduced from headphones for enhanced immersion in some cases. Such sound reproduction is called sound VR or sound AR.

Furthermore, regarding display of a video in a head-mounted display, a method for correcting a drawing direction on the basis of prediction of a head motion has been proposed for the purpose of improving VR sickness caused by a delay in a video processing system (see, for example, Patent Document 1).

CITATION LIST

Patent Document

Patent Document 1: Japanese Patent Application Laid-Open No. 2019-28368

SUMMARY OF THE INVENTION

Problems to be Solved by the Invention

On the other hand, regarding binaural reproduction of sound in the head-mounted display, in a similar manner to the case of video, a processing delay causes a reproduced output to deviate from an intended direction.

Moreover, while a light wave propagates instantaneously in the range of distance covered in VR, a sound wave propagates with a significant delay. Thus, in sound VR or sound AR, a deviation also occurs in the direction of the reproduced output, depending on a head motion of a listener and a propagation delay time.

When such a deviation of the reproduced output associated with a processing delay or a motion of the listener's head occurs, a sound space that is supposed to be reproduced is distorted, and accurate sound reproduction cannot be achieved.

The present technology has been made in view of such a situation, and allows for prevention of distortion of a sound space.

Solutions to Problems

One aspect of the present technology provides a signal processing device including: a relative azimuth prediction unit configured to predict, on the basis of a delay time in accordance with a distance from a virtual sound source to a listener, a relative azimuth of the virtual sound source when a sound of the virtual sound source reaches the listener; and a BRIR generation unit configured to acquire a head-related transfer function of the relative azimuth for each one of a plurality of the virtual sound sources and generate a BRIR on the basis of a plurality of the acquired head-related transfer functions.

One aspect of the present technology provides a signal processing method or a program including steps of: predicting, on the basis of a delay time in accordance with a distance from a virtual sound source to a listener, a relative azimuth of the virtual sound source when a sound of the virtual sound source reaches the listener; and acquiring a head-related transfer function of the relative azimuth for each one of a plurality of the virtual sound sources and generating a BRIR on the basis of a plurality of the acquired head-related transfer functions.

In one aspect of the present technology, on the basis of a delay time in accordance with a distance from a virtual sound source to a listener, a relative azimuth of the virtual sound source when a sound of the virtual sound source reaches the listener is predicted; and a head-related transfer function of the relative azimuth is acquired for each one of a plurality of the virtual sound sources and a BRIR is generated on the basis of a plurality of the acquired head-related transfer functions.

MODE FOR CARRYING OUT THE INVENTION

Figure 1:
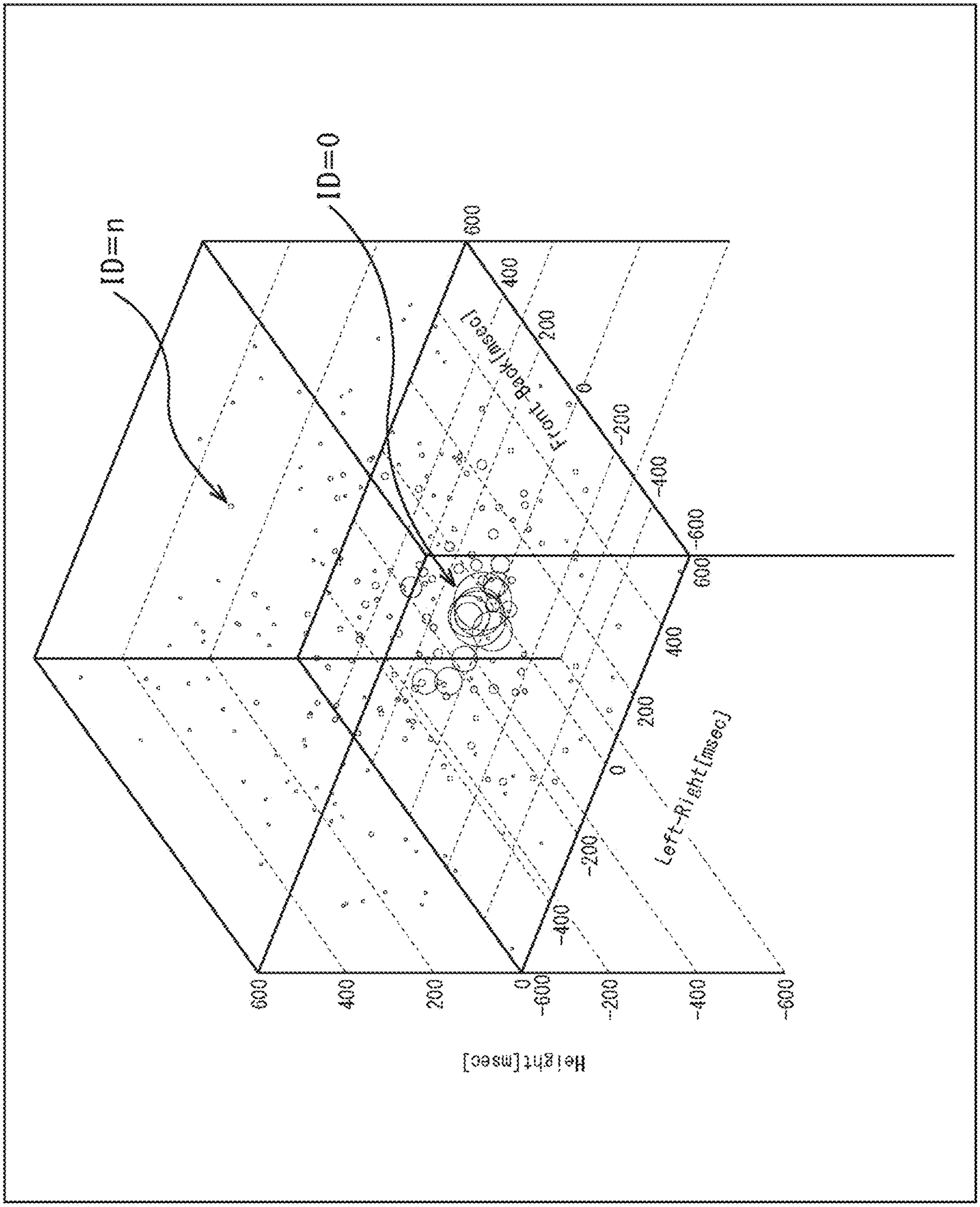
FIG. 1 is a diagram illustrating a display example of a three-dimensional bubble chart of an RIR.

An embodiment to which the present technology is applied will be described below with reference to the drawings.

First Embodiment

<Present Technology>

In the present technology, distortion (skew) of a sound space is corrected with the use of head angular velocity information and head angular acceleration information for more accurate sound reproduction.

For example, in sound VR or sound AR, processing of convolving, with an input sound source, a binaural-room impulse response (BRIR) obtained by convolving a head-related impulse response (HRIR) with a room impulse response (RIR) is performed.

Here, the RIR is information constituted by a transmission characteristic of sound in a predetermined space and the like. Furthermore, the HRIR is a head-related transfer function. In particular, a head related transfer function (HRTF), which is information regarding a frequency domain for adding a transmission characteristic from an object (sound source) to each of the left and right ears of a listener, is expressed in time domain.

The BRIR is an impulse response for reproducing sound (binaural sound) that would be heard by a listener in a case where a sound is emitted from an object in a predetermined space.

The RIR is constituted by information regarding each one of a plurality of virtual sound sources such as a direct sound and an indirect sound, and each virtual sound source has different attributes such as spatial coordinates and intensity.

For example, when one object (audio object) emits a sound in a space, a listener hears a direct sound and an indirect sound (reflected sound) from the object.

When each of such a direct sound and an indirect sound is regarded as one virtual sound source, it can be said that the object is constituted by a plurality of virtual sound sources, and information constituted by a transmission characteristic of the sound of each one of the plurality of virtual sound sources and the like is the RIR of the object.

In general, in a technology for reproducing a BRIR in accordance with a head azimuth of a listener by a head tracking, a BRIR measured or calculated for each head azimuth in a state where the listener's head remains stationary is held in a coefficient memory or the like. Then, at the time of sound reproduction, a BRIR held in the coefficient memory or the like is selected and used in accordance with head azimuth information from a sensor.

However, such a method is based on the premise that the listener's head remains stationary, and is not capable of accurately reproducing the sound space during a head motion.

Specifically, for example, in a case where sounds are simultaneously emitted from two virtual sound sources, there is a delay of about one second between reproduction of the sound from the one of the virtual sound sources that is located at a shorter distance, such as at a distance of 1 m from the listener, and reproduction of the sound from the virtual sound source located at a longer distance, such as at a distance of 340 m from the listener.

However, in a general head tracking, sound signals of these two virtual sound sources are convolved with a BRIR of one azimuth selected on the basis of the same head azimuth information.

Thus, in a state where the listener's head remains stationary, the azimuths of these two virtual sound sources with respect to the listener are correct. However, in a state where the head azimuth changes in accordance with a head motion during one second, the azimuths of the two virtual sound sources with respect to the listener are not correct, and a deviation occurs also in a relative azimuth relationship therebetween. This is perceived by the listener as distortion of the sound space, and has caused a problem in grasping the sound space by hearing.

Therefore, in the present technology, BRIR combining processing (rendering) corresponding to a head tracking is performed with the use of head angular velocity information and head angular acceleration information in addition to head angle information, which is sensor information used in a general head tracking.

With this arrangement, distortion (skew) of a sound space perceived when a listener (user) rotates the listener's head is corrected, which has not been possible with a general head tracking.

Specifically, on the basis of information regarding the time required for propagation between the listener and each virtual sound source used for BRIR rendering and information regarding a delay in processing of convolution operation, a delay time from when head rotational motion information for the BRIR rendering is acquired until the sound from the virtual sound source reaches the listener is calculated.

Then, at the time of the BRIR rendering, the relative azimuth is corrected in advance so that each virtual sound source may exist in a predicted relative azimuth at a time in the future delayed by that delay time. Thus, an azimuth deviation of each virtual sound source is corrected, in which the generation amount is determined depending on the distance to the virtual sound source and a pattern of the head rotational motion.

For example, in a general head tracking, a BRIR measured or calculated for each head azimuth is held in a coefficient memory or the like, and the BRIR is selected and used in accordance with head azimuth information from a sensor.

On the other hand, BRIRs are successively combined by rendering in the present technology.

That is, information of all virtual sound sources is held in a memory as RIRs independently from each other, and the BRIRs are reconstructed with the use of an HRIR entire circumference database and head rotational motion information.

Since a relative azimuth of a virtual sound source from a listener during a head rotational motion depends also on the distance from the listener to the virtual sound source, it is necessary to correct the relative azimuth independently for each virtual sound source.

In a general technique, only BRIRs in a state where the head remains stationary have been able to be accurately reproduced in principle. In the present technology, the relative azimuth is corrected independently for each virtual sound source by BRIR rendering, so that the sound space during the head rotational motion can be reproduced more accurately.

Furthermore, a relative azimuth prediction unit is incorporated in a BRIR generation processing unit that performs the above-described BRIR rendering. The relative azimuth prediction unit accepts three inputs: information regarding the time required for propagation to the listener, which is an attribute of each virtual sound source; head angle information, head angular velocity information, and head angular acceleration information from a sensor; and processing latency information of a convolution signal processing unit.

By incorporating the relative azimuth prediction unit, it is possible to individually predict the relative azimuth of each virtual sound source when the sound of the virtual sound source reaches the listener, so that the optimum azimuth is corrected for each virtual sound source at the time of BRIR rendering. With this arrangement, a perception that a sound space is distorted during a head rotational motion is prevented.

Now, the present technology will be described below in more detail.

FIG. 1 illustrates a display example of a three-dimensional bubble chart of an RIR.

In FIG. 1, the origin of orthogonal coordinates is located at the position of a listener, and one circle drawn in the drawing represents one virtual sound source.

In particular, here, the position and size of each circle respectively represent the spatial position of the virtual sound source and the relative intensity of the virtual sound source from the listener's perspective, that is, the loudness of the sound of the virtual sound source heard by the listener.

Furthermore, the distance from the origin of each virtual sound source corresponds to the propagation time it takes the sound of the virtual sound source to reach the listener.

An RIR is constituted by such information regarding a plurality of virtual sound sources corresponding to one object that exists in a space.

Here, an influence of a head motion of a listener on a plurality of virtual sound sources of an RIR will be described with reference to FIGS. 2 to 4. Note that, in FIGS. 2 to 4, the same reference numerals are given to portions that correspond to each other, and the description thereof will be omitted as appropriate.

Hereinafter, a virtual sound source in which 0 is set as the value of an ID for identifying the virtual sound source and a virtual sound source in which n is set as the value of the ID will be described as an example, the virtual sound sources being included in the plurality of virtual sound sources illustrated in FIG. 1.

For example, the virtual sound source with ID=0 in FIG. 1 is relatively close to the listener, that is, has a relatively short distance from the origin.

On the other hand, the virtual sound source with ID=n in FIG. 1 is relatively far from the listener, that is, has a relatively long distance from the origin.

Note that, hereinafter, the virtual sound source with ID=0 will also be referred to as a virtual sound source AD0, and the virtual sound source with ID=n will also be referred to as a virtual sound source ADn.

Figure 2:
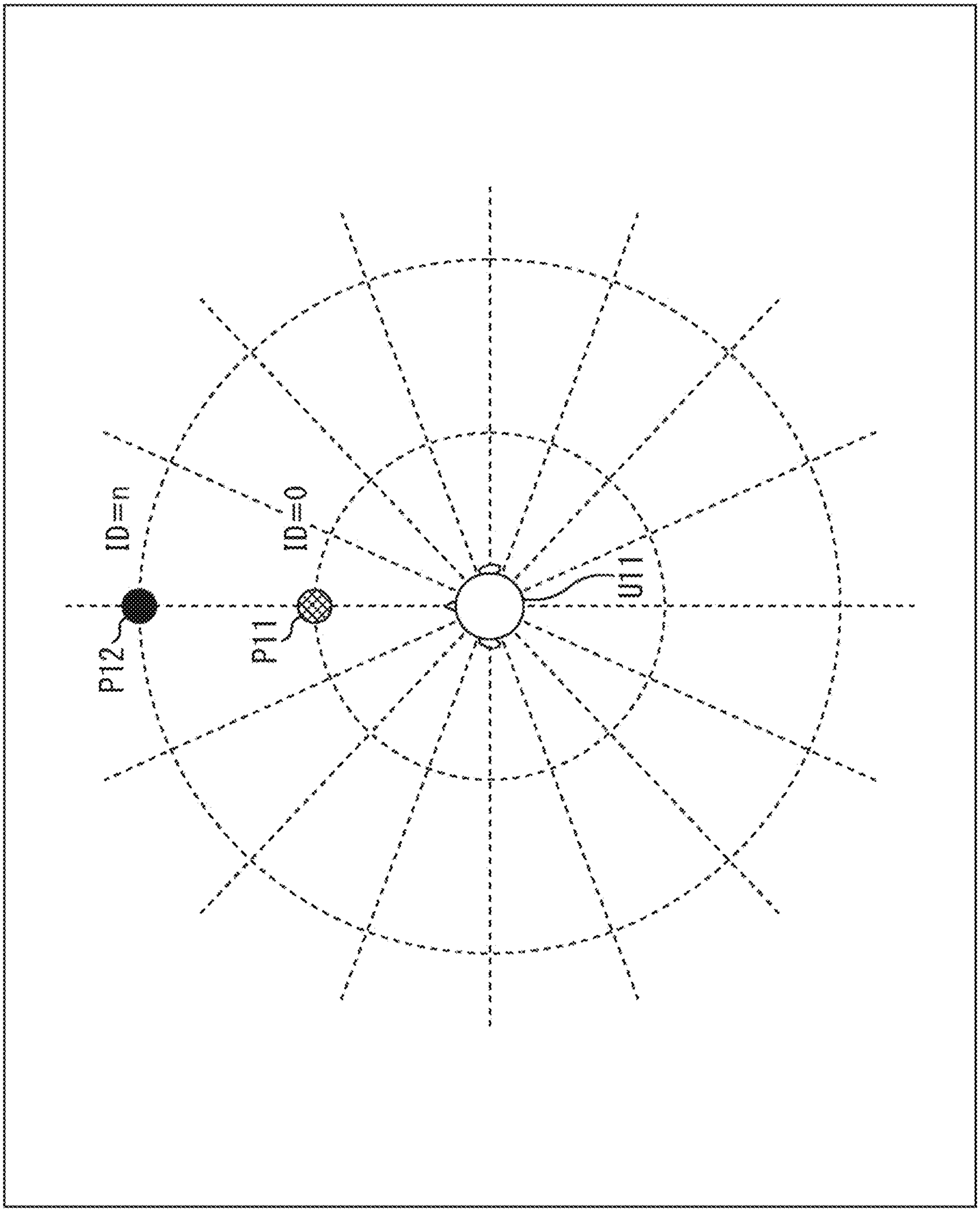
FIG. 2 is a diagram illustrating the position of a virtual sound source perceived by a listener in a case where a head remains stationary.

FIG. 2 schematically illustrates the position of the virtual sound source perceived by the listener in a case where the listener's head remains stationary. In particular, FIG. 2 illustrates a listener U11 as viewed from above.

In the example illustrated in FIG. 2, the virtual sound source AD0 is at a position P11, and the virtual sound source ADn is at a position P12. Therefore, the virtual sound source AD0 and the virtual sound source ADn are located in front of the listener U11, and the listener U11 perceives that the sound of the virtual sound source AD0 and the sound of the virtual sound source ADn are heard from the front of the listener.

Figure 3:
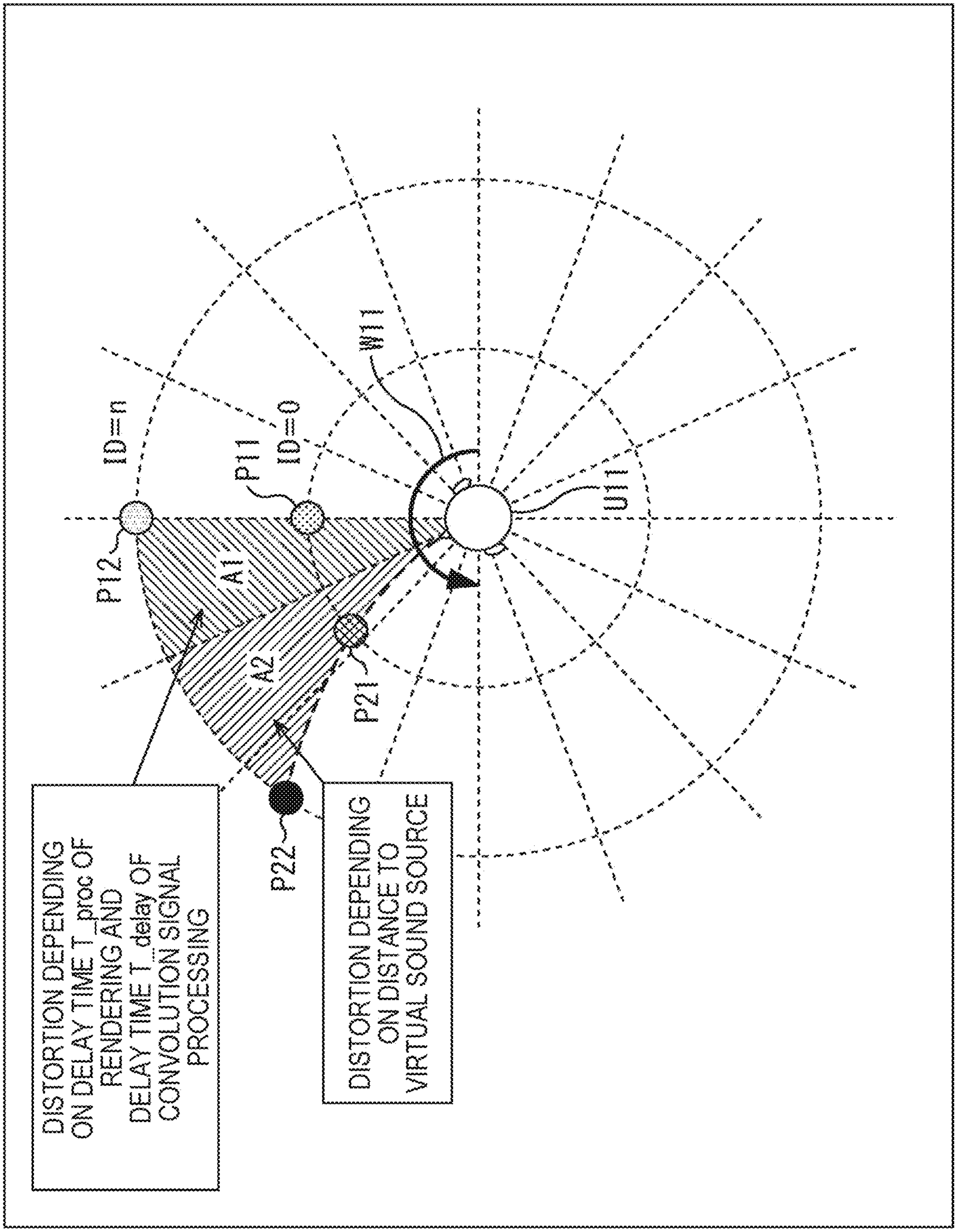
FIG. 3 is a diagram illustrating the position of the virtual sound source perceived by the listener when the head is rotating at a constant angular velocity.

Next, FIG. 3 illustrates the positions of the virtual sound sources perceived by the listener U11 when the head of the listener U11 rotates counterclockwise at a constant angular velocity.

In this example, the listener U11 rotates the listener's head at a constant angular velocity in the direction indicated by an arrow W11, that is, in the counterclockwise direction in the drawing.

Since BRIR rendering generally requires a large amount of processing, the BRIR is updated at an interval of several thousands to tens of thousands of samples. This corresponds to an interval of 0.1 seconds or more in terms of time.

Thus, a delay occurs during a period from when a BRIR is updated and then the BRIR is subjected to convolution signal processing with an input sound source until a processed sound in which the BRIR has been reflected starts to be output. Then, the change in the azimuth of the virtual sound source due to the head motion during that period fails to be reflected in the BRIR.

As a result, for example, in the example illustrated in FIG. 3, a deviation of the azimuth (hereinafter also referred to as an azimuth deviation A1) by an amount represented by an area A1 occurs. The azimuth deviation A1 is distortion depending on a delay time T_proc of rendering to be described later and a delay time T_delay of convolution signal processing.

Furthermore, also after the processed sound of the virtual sound source in which the BRIR has been reflected has started to be output, there is a time delay corresponding to the propagation delay of the sound of each virtual sound source during a period until the processed sound of each virtual sound source reaches the listener U11, that is, until the processed sound of each virtual sound source is reproduced by headphones or the like.

Therefore, in a case where the head azimuth of the listener U11 changes due to a head motion also during that period, this change in the head azimuth is not reflected in the BRIR, and a deviation of the azimuth (hereinafter also referred to as an azimuth deviation A2) represented by an area A2 further occurs.

The azimuth deviation A2 is a distortion depending on the distance between the listener U11 and the virtual sound source, and increases in proportion to the distance.

The listener U11 perceives the azimuth deviation A1 and the azimuth deviation A2 as distortion of a concentric sound space.

Thus, in the example illustrated in FIG. 3, the sound of the virtual sound source AD0 is reproduced in such a way that a sound image, which is supposed to be localized at the position P11 as viewed from the listener U11, is actually localized at a position P21.

Similarly, as for the virtual sound source ADn, a sound image, which is supposed to be localized at the position P12 as viewed from the listener U11, is actually localized at a position P22.

Figure 4:
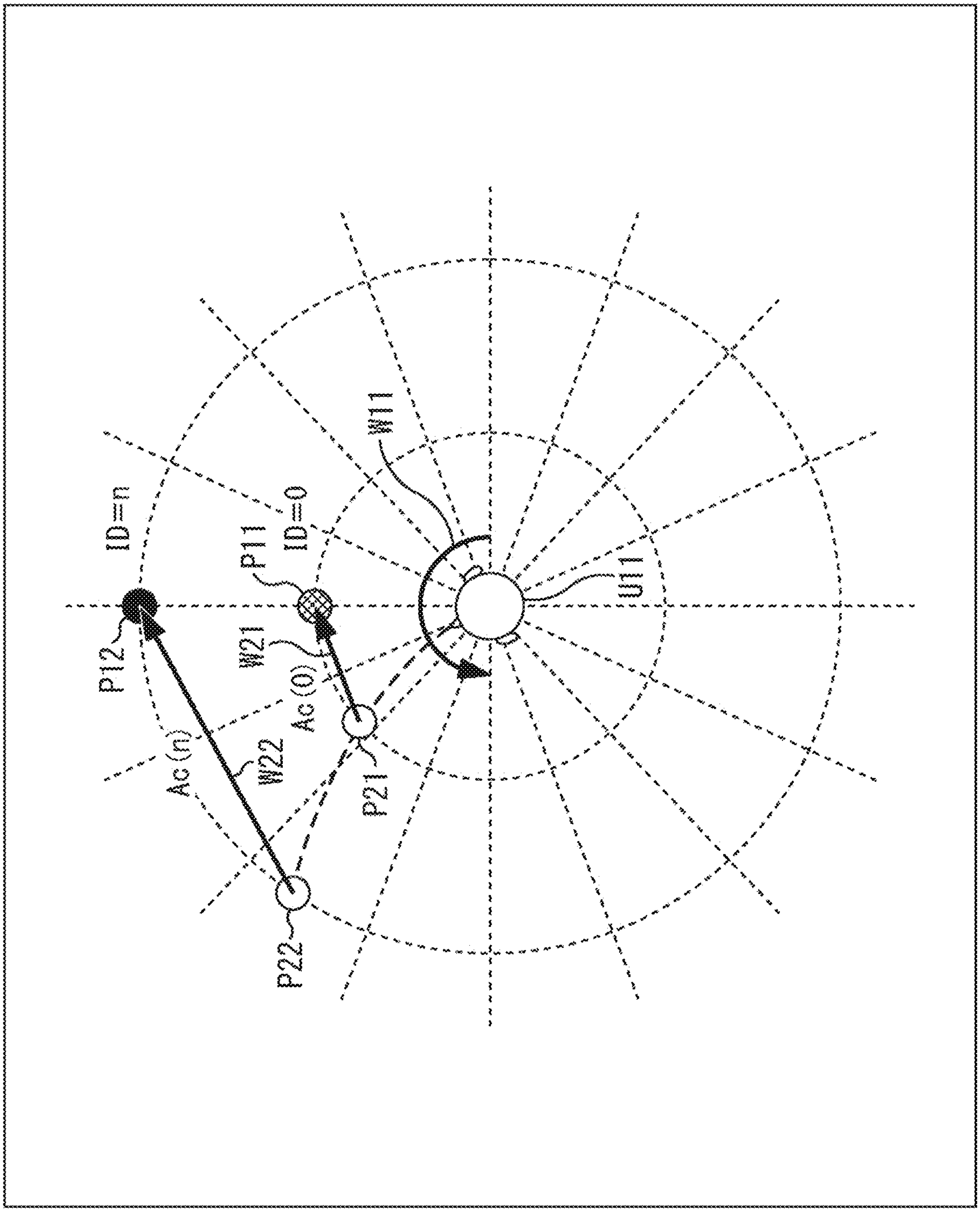
FIG. 4 is a diagram illustrating a BRIR correction in accordance with the rotation of the head.

Thus, in the present technology, as illustrated in FIG. 4, the relative azimuth of each virtual sound source viewed from the listener U11 is corrected in advance to be a predicted azimuth (hereinafter also referred to as a predicted relative azimuth) at the time when the sound of each virtual sound source reaches the listener U11, and then BRIR rendering is performed.

With this arrangement, the deviation of the azimuth of each virtual sound source and the distortion of the sound space caused by the rotation of the head of the listener U11 are corrected. In other words, distortion of the sound space is prevented. As a result, more accurate sound reproduction can be achieved.

Here, the relative azimuth of a virtual sound source is an azimuth indicating the relative position (direction) of the virtual sound source with respect to the front direction of the listener U11. That is, the relative azimuth of the virtual sound source is angle information indicating the apparent position (direction) of the virtual sound source viewed from the listener U11.

For example, the relative azimuth of the virtual sound source is represented by an azimuth angle indicating the position of the virtual sound source defined with the front direction of the listener U11 as the origin of polar coordinates. Here, in particular, the relative azimuth of the virtual sound source obtained by prediction, that is, a predicted value (estimated value) of the relative azimuth is referred to as a predicted relative azimuth.

In the example in FIG. 4, the relative azimuth of the virtual sound source AD0 is corrected by an amount indicated by an arrow W21 to be a predicted relative azimuth Ac(0), and the relative azimuth of the virtual sound source ADn is corrected by an amount indicated by an arrow W22 to be a predicted relative azimuth Ac(n).

Therefore, at the time of sound reproduction, the sound images of the virtual sound source AD0 and the virtual sound source ADn are localized in the correct directions (azimuths) as viewed from the listener U11.

Configuration Example of Signal Processing Device

Figure 5:
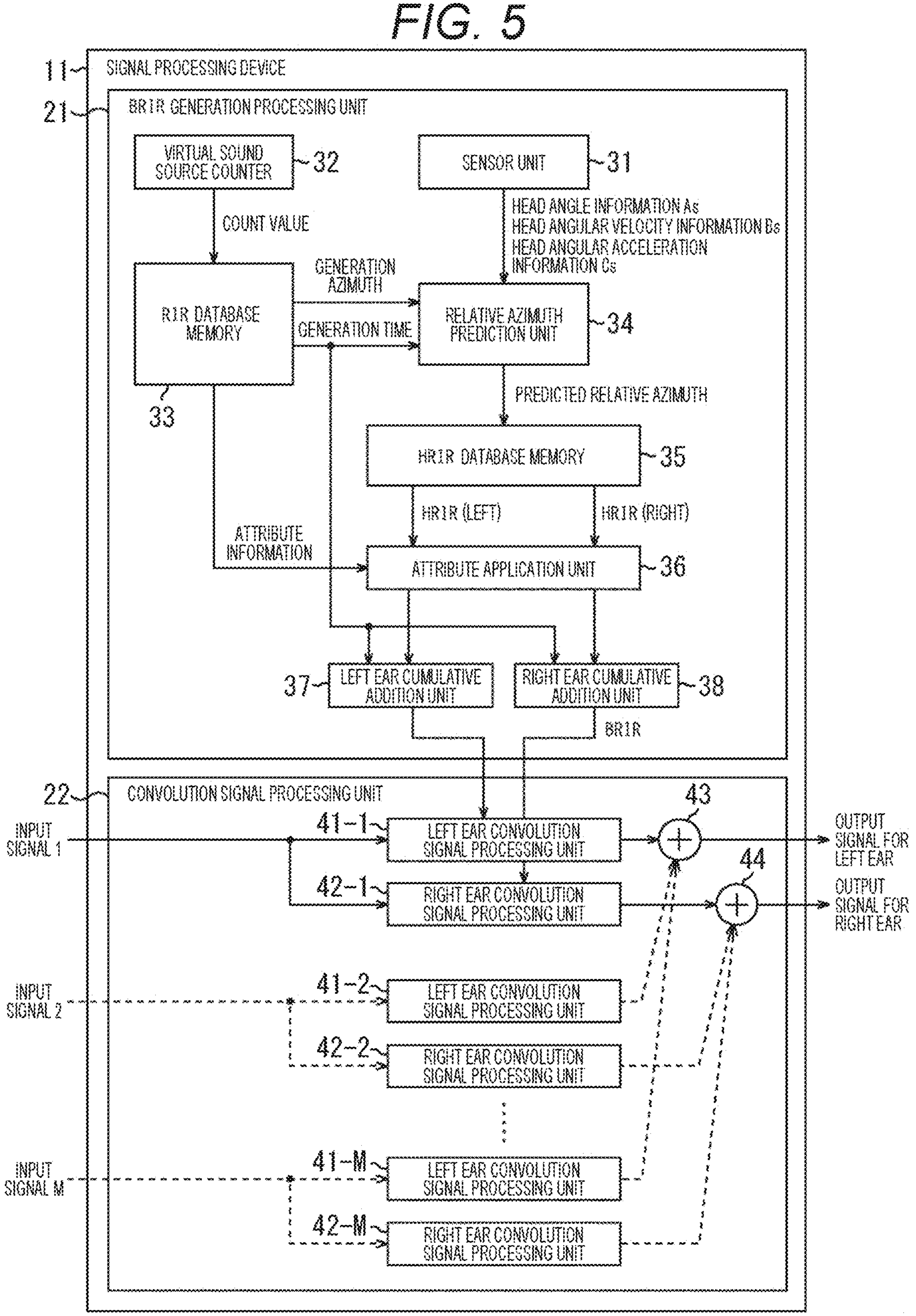
FIG. 5 is a diagram illustrating a configuration example of a signal processing device.

FIG. 5 is a diagram illustrating a configuration example of one embodiment of a signal processing device to which the present technology is applied.

In FIG. 5, a signal processing device 11 is constituted by, for example, headphones, a head-mounted display, and the like, and includes a BRIR generation processing unit 21 and a convolution signal processing unit 22.

In the signal processing device 11, the BRIR generation processing unit 21 performs BRIR rendering.

Furthermore, the convolution signal processing unit 22 performs convolution signal processing of an input signal, which is a sound signal of an object that has been input, and a BRIR generated by the BRIR generation processing unit 21, and generates an output signal for reproducing a direct sound, an indirect sound, and the like of the object.

Note that, in the following description, it is assumed that N virtual sound sources exist as virtual sound sources corresponding to an object, and an i-th (where $0 \le i \le N-1$) virtual sound source is also referred to as a virtual sound source i. The virtual sound source i is a virtual sound source with ID=i.

Furthermore, here, input signals of M channels are input to the convolution signal processing unit 22, and an input signal of an m-th (where $1 \le m \le M$) channel (channel m) is also referred to as an input signal m. These input signals m are sound signals for reproducing the sound of the object.

The BRIR generation processing unit 21 includes a sensor unit 31, a virtual sound source counter 32, an RIR database memory 33, a relative azimuth prediction unit 34, an HRIR database memory 35, an attribute application unit 36, a left ear cumulative addition unit 37, and a right ear cumulative addition unit 38.

Furthermore, the convolution signal processing unit 22 includes a left ear convolution signal processing unit 41-1 to a left ear convolution signal processing unit 41-M, a right ear convolution signal processing unit 42-1 to a right ear convolution signal processing unit 42-M, an addition unit 43, and an addition unit 44.

Note that, hereinafter, the left ear convolution signal processing unit 41-1 to the left ear convolution signal processing unit 41-M will also be simply referred to as left ear convolution signal processing units 41 in a case where it is not particularly necessary to distinguish between them.

Similarly, hereinafter, the right ear convolution signal processing unit 42-1 to the right ear convolution signal processing unit 42-M will also be simply referred to as right ear convolution signal processing units 42 in a case where it is not particularly necessary to distinguish between them.

The sensor unit 31 is constituted by, for example, an angular velocity sensor, an angular acceleration sensor, or the like attached to the head of a user who is a listener. The sensor unit 31 acquires, by measurement, head rotational motion information, which is information regarding a movement of the listener's head, that is, a rotational motion of the head, and supplies the information to the relative azimuth prediction unit 34.

Here, the head rotational motion information includes, for example, at least one of head angle information As, head angular velocity information Bs, or head angular acceleration information Cs.

The head angle information As is angle information indicating a head azimuth, which is an absolute head orientation (direction) of a listener in a space.

For example, the head angle information As is represented by an azimuth angle indicating the orientation of the head (head azimuth) of the listener defined using, as the origin of polar coordinates, a predetermined direction in a space such as a room where the listener is.

The head angular velocity information Bs is information indicating the angular velocity of a movement of the listener's head, and the head angular acceleration information Cs is information indicating the angular acceleration of the movement of the listener's head.

Note that an example in which the head rotational motion information includes the head angle information As, the head angular velocity information Bs, and the head angular acceleration information Cs will be described below. However, the head rotational motion information may not include the head angular velocity information Bs or the head angular acceleration information Cs, or may include another piece of information indicating the movement (rotational motion) of the listener's head.

For example, the head angular acceleration information Cs is only required to be used in a case where the head angular acceleration information Cs can be acquired. In a case where the head angular acceleration information Cs can be used, the relative azimuth can be predicted with higher accuracy, but, in essence, the head angular acceleration information Cs is not necessarily required.

Furthermore, the angular velocity sensor for obtaining the head angular velocity information Bs is not limited to a general vibration gyro sensor, but may be of any detection principle such as one using an image, ultrasonic waves, a laser, or the like.

The virtual sound source counter 32 generates count values in order from 1 up to a maximum number N of virtual sound sources included in an RIR database, and supplies the count values to the RIR database memory 33.

The RIR database memory 33 holds the RIR database. In the RIR database, a generation time T(i), a generation azimuth A(i), attribute information, and the like for each virtual sound source i are recorded in association with each other as an RIR, that is, transmission characteristics of a predetermined space.

Here, the generation time T(i) indicates the time at which a sound of the virtual sound source i is generated, for example, the reproduction start time of the sound of the virtual sound source i in an output signal frame.

The generation azimuth A(i) indicates an absolute azimuth (direction) of the virtual sound source i in the space, that is, angle information such as an azimuth angle indicating an absolute generation position of the sound of the virtual sound source i.

Furthermore, the attribute information is information indicating characteristics of the virtual sound source i such as intensity (loudness) and a frequency characteristic of the sound of the virtual sound source i.

The RIR database memory 33 uses a count value supplied from the virtual sound source counter 32 as a retrieval key to retrieve and read, from the RIR database that is held, the generation time T(i), the generation azimuth A(i), and the attribute information of the virtual sound source i indicated by the count value.

The RIR database memory 33 supplies the generation time T(i) and the generation azimuth A(i) that have been read to the relative azimuth prediction unit 34, supplies the generation time T(i) to the left ear cumulative addition unit 37 and the right ear cumulative addition unit 38, and supplies the attribute information to the attribute application unit 36.

The relative azimuth prediction unit 34 predicts a predicted relative azimuth Ac(i) of the virtual sound source i on the basis of the head rotational motion information supplied from the sensor unit 31 and the generation time T(i) and the generation azimuth A(i) supplied from the RIR database memory 33.

Here, the predicted relative azimuth Ac(i) is a predicted value of a relative direction (azimuth) of the virtual sound source i with respect to the listener at the time when the sound of the virtual sound source i reaches the user who is the listener, that is, a predicted value of the relative azimuth of the virtual sound source i viewed from the listener.

In other words, the predicted relative azimuth Ac(i) is a predicted value of the relative azimuth of the virtual sound source i at the time when the sound of the virtual sound source i is reproduced by an output signal, that is, at the time when the sound of the virtual sound source i is actually presented to the listener.

Figure 6:
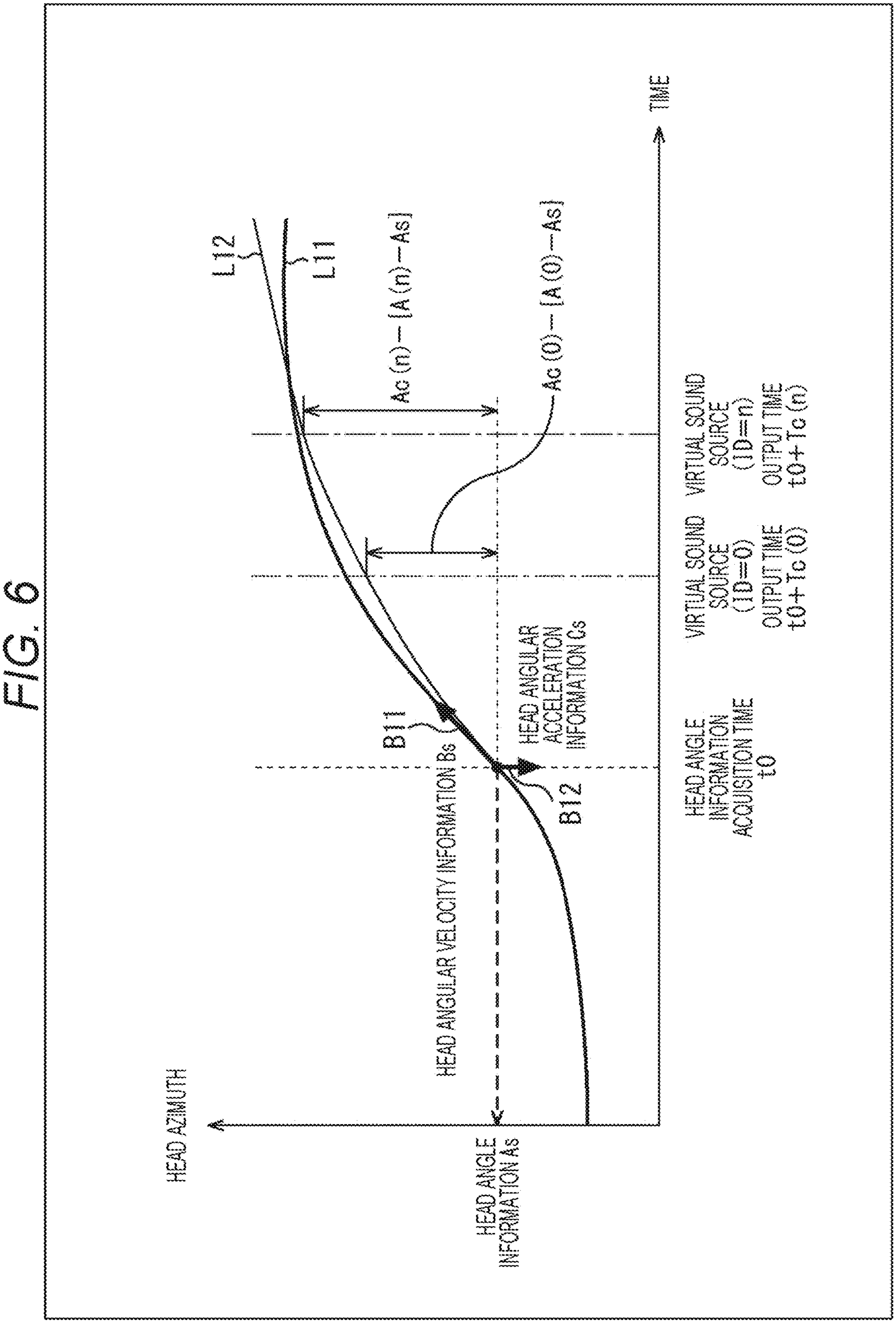
FIG. 6 is a diagram schematically illustrating an outline of prediction of a predicted relative azimuth.

FIG. 6 schematically illustrates an outline of prediction of the predicted relative azimuth Ac(i).

Note that, in FIG. 6, a vertical axis represents the absolute azimuth in the front direction of the listener's head, that is, the head azimuth, and a horizontal axis represents the time.

In this example, a curve L11 indicates the actual movement of the listener's head, that is, the change in the actual head azimuth.

For example, at time t0 at which the head angle information As or the like is acquired by the sensor unit 31, the head azimuth of the listener is the azimuth indicated by the head angle information As.

Furthermore, although the actual head azimuth of the listener after time t0 is unknown at the point of time t0, the head azimuth after time t0 is predicted on the basis of the head angle information As, the head angular velocity information Bs, and the head angular acceleration information Cs at time t0.

Here, an arrow B11 represents the angular velocity indicated by the head angular velocity information Bs acquired at time t0, and an arrow B12 represents the angular acceleration indicated by the head angular acceleration information Cs acquired at time to. Furthermore, a curve L12 represents a result of prediction of the head azimuth of the listener after time t0 estimated at the point of time t0.

For example, Tc(0) is set as a delay time from when the sensor unit 31 acquires head rotational motion information, which is obtained for the virtual sound source AD0 with ID=0, that is, i=0th, until the sound of the virtual sound source AD0 reaches the listener.

In this case, the value of the curve L12 at time t0+Tc(0) is the predicted value of the head azimuth when the listener actually listens to the sound of the virtual sound source AD0.

Therefore, the difference between the head azimuth and the head azimuth indicated by the head angle information As is expressed by Ac(0)−{A(0)−As}.

Similarly, for example, when the delay time of the virtual sound source ADn with ID=n is expressed by Tc(n), the difference between the value of the curve L12 at time t0+Tc(n) and the head azimuth indicated by the head angle information As is expressed by Ac(n)−{A(n)−As}.

Returning to the description of FIG. 5, more specifically, when obtaining the predicted relative azimuth Ac(i), the relative azimuth prediction unit 34 first calculates the following Equation (1) on the basis of the generation time T(i) to calculate a delay time Tc(i) of the virtual sound source i.

The delay time Tc(i) is the time from when the sensor unit 31 acquires the head rotational motion information of the listener's head until the sound of the virtual sound source i reaches the listener.

[Math. 1]

$$Tc(i)=T\_proc+T\_delay+T(i) \quad (1)$$

Note that, in Equation (1), T_proc indicates a delay time due to processing of generating (updating) a BRIR.

More specifically, T_proc indicates the delay time from when the sensor unit 31 acquires head rotational motion information until a BRIR is updated and application of the BRIR is started in the left ear convolution signal processing unit 41 and the right ear convolution signal processing unit 42.

Furthermore, in Equation (1), T_delay indicates a delay time due to convolution signal processing of the BRIR.

More specifically, T_delay indicates a delay time from when application of the BRIR is started in the left ear convolution signal processing unit 41 and the right ear convolution signal processing unit 42, that is, from when convolution signal processing is started, until start of reproduction of the beginning of the output signal (the beginning of the frame) corresponding to a result of the processing. In particular, the delay time T_delay is determined by an algorithm of the convolution signal processing of the BRIR and a sampling frequency and a frame size of the output signal.

A sum of the delay time T_proc and the delay time T_delay corresponds to the above-described azimuth deviation A1 in FIG. 3, and the generation time T(i) corresponds to the above-described azimuth deviation A2 in FIG. 3.

When the delay time Tc(i) is obtained in this way, the relative azimuth prediction unit 34 calculates the predicted relative azimuth Ac(i) by calculating the following Equation (2) on the basis of the delay time Tc(i), the generation azimuth A(i), the head angle information As, the head angular velocity information Bs, and the head angular acceleration information Cs. Note that Equation (1) and Equation (2) may be calculated simultaneously.

[Math. 2]

$$Ac(i)=A(i)-\{As+Bs\times Tc(i)+Cs\times Tc(i)^2\} \quad (2)$$

Furthermore, the method of predicting the predicted relative azimuth Ac(i) is not limited to the method described above, but may be any method. For example, the method may be combined with a technique such as multiple regression analysis using previous records of the head movement.

The relative azimuth prediction unit 34 supplies the predicted relative azimuth Ac(i) obtained for the virtual sound source i to the HRIR database memory 35.

The HRIR database memory 35 holds an HRIR database including an HRIR (head-related transfer function) for each direction with the listener's head as the origin of polar coordinates. In particular, HRIRs in the HRIR database are impulse responses of two systems, an HRIR for the left ear and an HRIR for the right ear.

The HRIR database memory 35 retrieves and reads, from the HRIR database, HRIRs in the direction indicated by the predicted relative azimuth Ac(i) supplied from the relative azimuth prediction unit 34, and supplies the read HRIRs, that is, the HRIR for the left ear and the HRIR for the right ear, to the attribute application unit 36.

The attribute application unit 36 acquires the HRIRs output from the HRIR database memory 35, and adds a transmission characteristic for the virtual sound source i to the acquired HRIRs on the basis of the attribute information.

Specifically, on the basis of the attribute information from the RIR database memory 33, the attribute application unit 36 performs signal processing such as gain calculation or digital filter processing by a finite impulse response (FIR) filter or the like on the HRIRs from the HRIR database memory 35.

The attribute application unit 36 supplies the HRIRs for the left ear obtained as a result of the signal processing to the left ear cumulative addition unit 37, and supplies the HRIRs for the right ear to the right ear cumulative addition unit 38.

On the basis of the generation time T(i) of the virtual sound source i supplied from the RIR database memory 33, the left ear cumulative addition unit 37 cumulatively adds the HRIRs for the left ear supplied from the attribute application unit 36 in a data buffer having the same length as data of the BRIR for the left ear to be finally output.

At this time, the address (position) of the data buffer at which the cumulative addition of the HRIRs for the left ear is started is an address corresponding to the generation time T(i) of the virtual sound source i, more specifically, an address corresponding to a value obtained by multiplying the generation time T(i) by the sampling frequency of the output signal.

While the count values of 1 to N are output by the virtual sound source counter 32, the above-described cumulative addition is performed. With this arrangement, the HRIRs for the left ear of the N virtual sound sources are added (combined), and a final BRIR for the left ear is obtained.

The left ear cumulative addition unit 37 supplies the BRIR for the left ear to the left ear convolution signal processing unit 41.

Similarly, on the basis of the generation time T(i) of the virtual sound source i supplied from the RIR database memory 33, the right ear cumulative addition unit 38 cumulatively adds the HRIRs for the right ear supplied from the attribute application unit 36 in a data buffer having the same length as data of the BRIR for the right ear to be finally output.

Also in this case, the address (position) of the data buffer at which the cumulative addition of the HRIRs for the right ear is started is an address corresponding to the generation time T(i) of the virtual sound source i.

The right ear cumulative addition unit 38 supplies the right ear convolution signal processing unit 42 with the BRIR for the right ear obtained by cumulative addition of the HRIRs for the right ear.

The attribute application unit 36 to the right ear cumulative addition unit 38 perform processing of generating a BRIR for an object by adding, to an HRIR, a transmission characteristic indicated by attribute information of a virtual sound source and combining the HRIRs to which the transmission characteristics obtained one for each virtual sound source have been added. This processing corresponds to processing of convolving an HRIR and an RIR.

Therefore, it can be said that the block constituted by the attribute application unit 36 to the right ear cumulative addition unit 38 functions as a BRIR generation unit that generates a BRIR by adding a transmission characteristic of a virtual sound source to an HRIR and combining the HRIRs to which the transmission characteristics have been added.

Note that, since the RIR database is different from channel to channel of the input signal, the BRIR is generated for each channel of the input signal.

Therefore, more specifically, the BRIR generation processing unit 21 is provided with the RIR database memory 33 for each channel m (where 1≤m≤M) of the input signal, for example.

Then, the RIR database memory 33 is switched for each channel m and the above-described processing is performed, and thus a BRIR of each channel m is generated.

The convolution signal processing unit 22 performs convolution signal processing of the BRIR and the input signal to generate an output signal.

That is, a left ear convolution signal processing unit 41-*m* (where 1≤m≤M) convolves a supplied input signal m and a BRIR for the left ear supplied from the left ear cumulative addition unit 37, and supplies an output signal for the left ear obtained as a result to the addition unit 43.

Similarly, a right ear convolution signal processing unit 42-*m* (where 1≤m≤M) convolves a supplied input signal m and a BRIR for the right ear supplied from the right ear cumulative addition unit 38, and supplies an output signal for the right ear obtained as a result to the addition unit 44.

The addition unit 43 adds the output signals supplied from the left ear convolution signal processing units 41, and outputs a final output signal for the left ear obtained as a result.

The addition unit 44 adds the output signals supplied from the right ear convolution signal processing units 42, and outputs a final output signal for the right ear obtained as a result.

The output signals obtained by the addition unit 43 and the addition unit 44 in this way are sound signals for reproducing a sound of each one of a plurality of virtual sound sources corresponding to the object.

<Generation of BRIR>

Here, generation of a BRIR and generation of an output signal with the use of the BRIR will be described.

Figure 7:
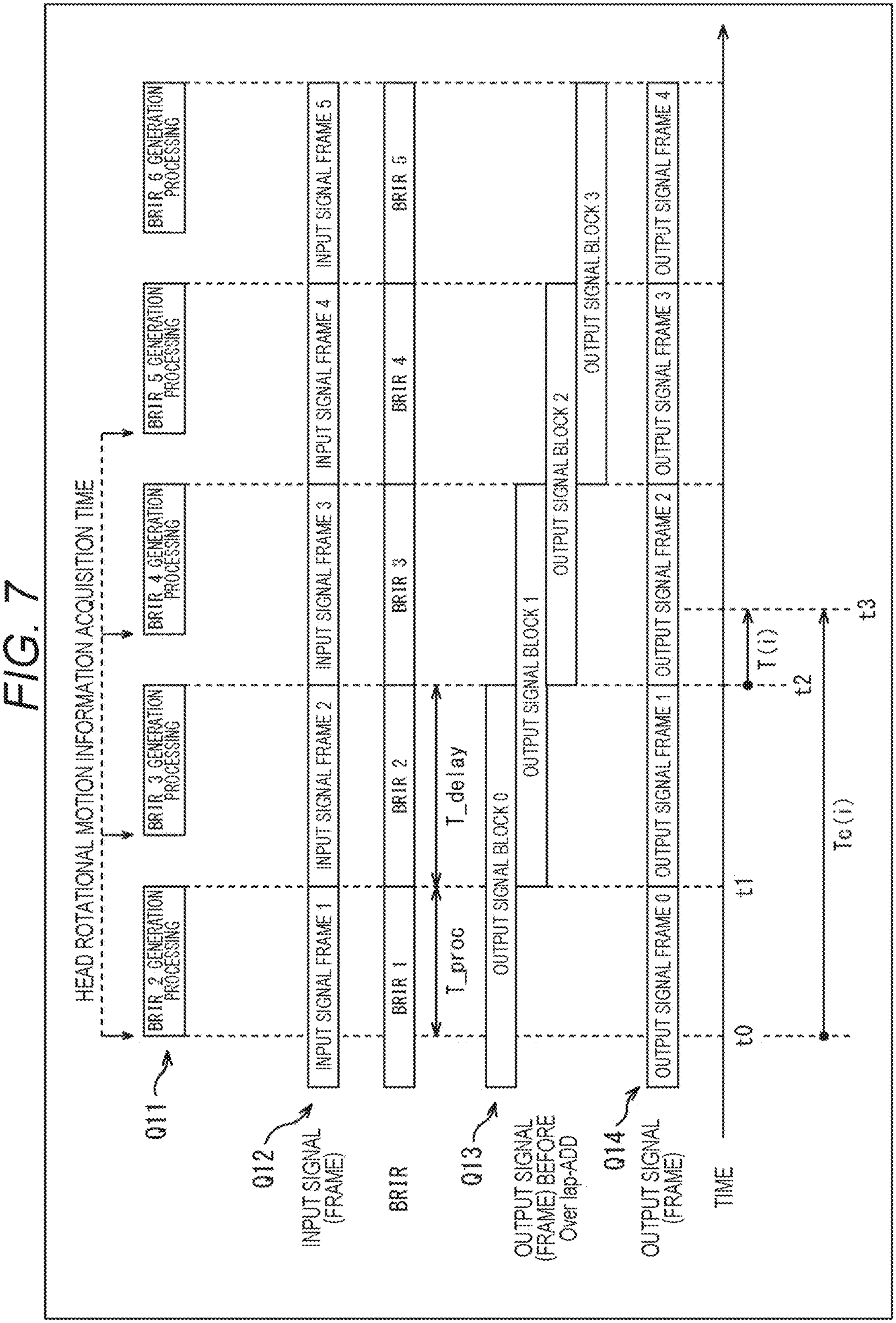
FIG. 7 is a diagram illustrating an example of a timing chart at the time of generating a BRIR and an output signal.
Figure 8:
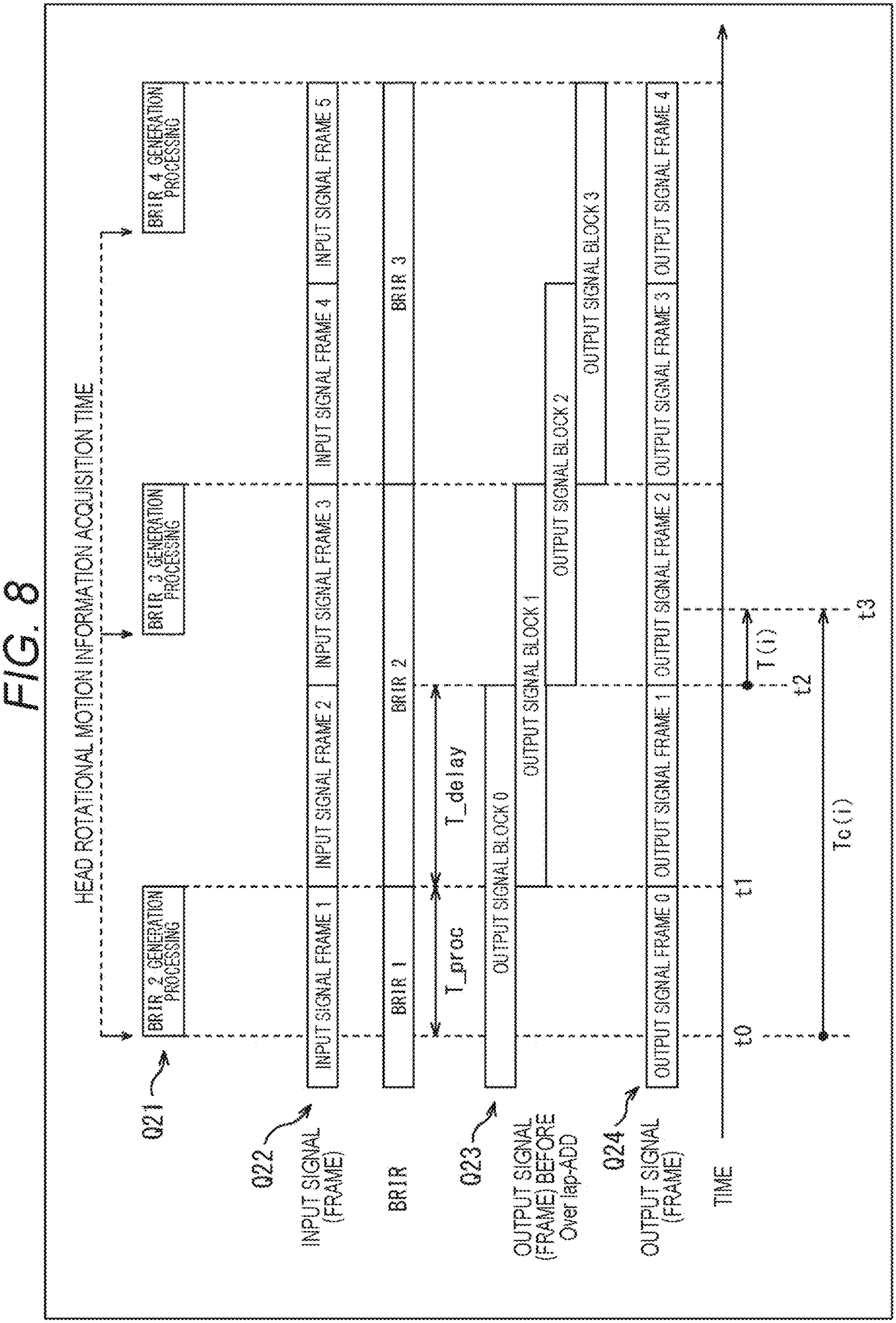
FIG. 8 is a diagram illustrating an example of a timing chart at the time of generating a BRIR and an output signal.

FIGS. 7 and 8 illustrate examples of a timing chart at the time of generation of a BRIR and an output signal. In particular, here, an example in which Overlap-Add method is used for convolution signal processing of an input signal and a BRIR is illustrated.

Note that, in FIGS. 7 and 8, the same reference numerals are given to the corresponding portions, and the description thereof will be omitted as appropriate. Furthermore, in FIGS. 7 and 8, the horizontal direction indicates the time.

FIG. 7 illustrates a timing chart in a case where the BRIR is updated at a time interval equivalent to the time frame size of the convolution signal processing of the BRIR, that is, the length of an input signal frame.

For example, a portion indicated by an arrow Q11 indicates a timing at which a BRIR is generated. In the drawing, each of downward arrows in the portion indicated by the arrow Q11 indicates a timing at which the sensor unit 31 acquires the head angle information As, that is, the head rotational motion information.

Furthermore, each square in the portion indicated by the arrow Q11 represents a period during which a k-th BRIR (hereinafter also referred to as a BRIRk) is generated, and here, the generation of the BRIR is started at the timing when the head angle information As is acquired.

Specifically, for example, generation (update) of a BRIR 2 is started at time t0, and the processing of generating the BRIR 2 ends by time t1. That is, the BRIR 2 is obtained at the timing of time t1.

Furthermore, a portion indicated by an arrow Q12 indicates a timing of convolution signal processing of an input signal frame and a BRIR.

For example, a period from time t1 to time t2 is a period of an input signal frame 2, and this period is when the input signal frame 2 and the BRIR 2 are convolved.

Therefore, focusing on the input signal frame 2 and the BRIR 2, the time from time t0 at which generation of the BRIR 2 is started to time t1 from which convolution of the BRIR 2 can be started is the above-described delay time T_proc.

Furthermore, convolution and overlap-add of the input signal frame 2 and the BRIR 2 are performed during the period from time t1 to time t2, and an output signal frame 2 starts to be output at time t2. Such a time from time t1 to time t2 is the delay time T_delay.

A portion indicated by an arrow Q13 illustrates an output signal block (frame) before the overlap-add, and a portion indicated by an arrow Q14 illustrates a final output signal frame obtained by the overlap-add.

That is, each square in the portion indicated by the arrow Q13 represents one block of the output signal before the overlap-add obtained by the convolution between the input signal and the BRIR.

On the other hand, each square in the portion indicated by the arrow Q14 represents one frame of the final output signal obtained by the overlap-add.

At the time of overlap-add, two neighboring output signal blocks are added, and one final frame of the output signal is obtained.

For example, an output signal block 2 is constituted by a signal obtained by convolution between the input signal frame 2 and the BRIR 2. Then, overlap-add of the second half of an output signal block 1 and the first half of the block 2 following the output signal block 1 is performed, and a final output signal frame 2 is obtained.

Here, focusing on a predetermined virtual sound source i reproduced by the output signal frame 2, the sum of the delay time T_proc, the delay time T_delay, and the generation time T(i) for the virtual sound source i is the above-described delay time Tc(i).

Therefore, it can be seen that the delay time Tc(i) for the input signal frame 2 corresponding to the output signal frame 2 is the time from time t0 to time t3, for example.

Furthermore, FIG. 8 illustrates a timing chart in a case where the BRIR is updated at a time interval equivalent to twice the time frame size of the convolution signal processing of the BRIR, that is, the length of the input signal frame.

For example, a portion indicated by an arrow Q21 indicates a timing at which a BRIR is generated, and a portion indicated by an arrow Q22 indicates a timing of convolution signal processing of an input signal frame and the BRIR.

Furthermore, a portion indicated by an arrow Q23 illustrates an output signal block (frame) before overlap-add, and a portion indicated by an arrow Q24 illustrates a final output signal frame obtained by the overlap-add.

In particular, in this example, one BRIR is generated at a time interval of two frames of the input signal. Therefore, focusing on the BRIR 2 as an example, the BRIR 2 is used not only for convolution with the input signal frame 2 but also for convolution with an input signal frame 3.

Furthermore, the output signal block 2 is obtained by convolution between the BRIR 2 and the input signal frame 2, and overlap-add of the first half of the output signal block 2 and the second half of the block 1 immediately before the block 2 is performed, and thus a final output signal frame 2 is obtained.

Also in such an output signal frame 2, in a similar manner to the case in FIG. 7, the time from time t0 at which generation of the BRIR 2 is started to time t3 indicated by the generation time T(i) for the virtual sound source i is the delay time Tc(i) for the virtual sound source i.

Note that FIGS. 7 and 8 illustrate examples in which Overlap-Add method is used as the convolution signal processing, but the present invention is not limited thereto, and Overlap-Save method, time domain convolution processing, or the like may be used. Even in such a case, only the delay time T_delay is different, and an appropriate BRIR can be generated and an output signal can be obtained in a similar manner to the case of Overlap-Add method.

<Description of BRIR Generation Processing>

Next, an operation of the signal processing device 11 will be described.

Figure 9:
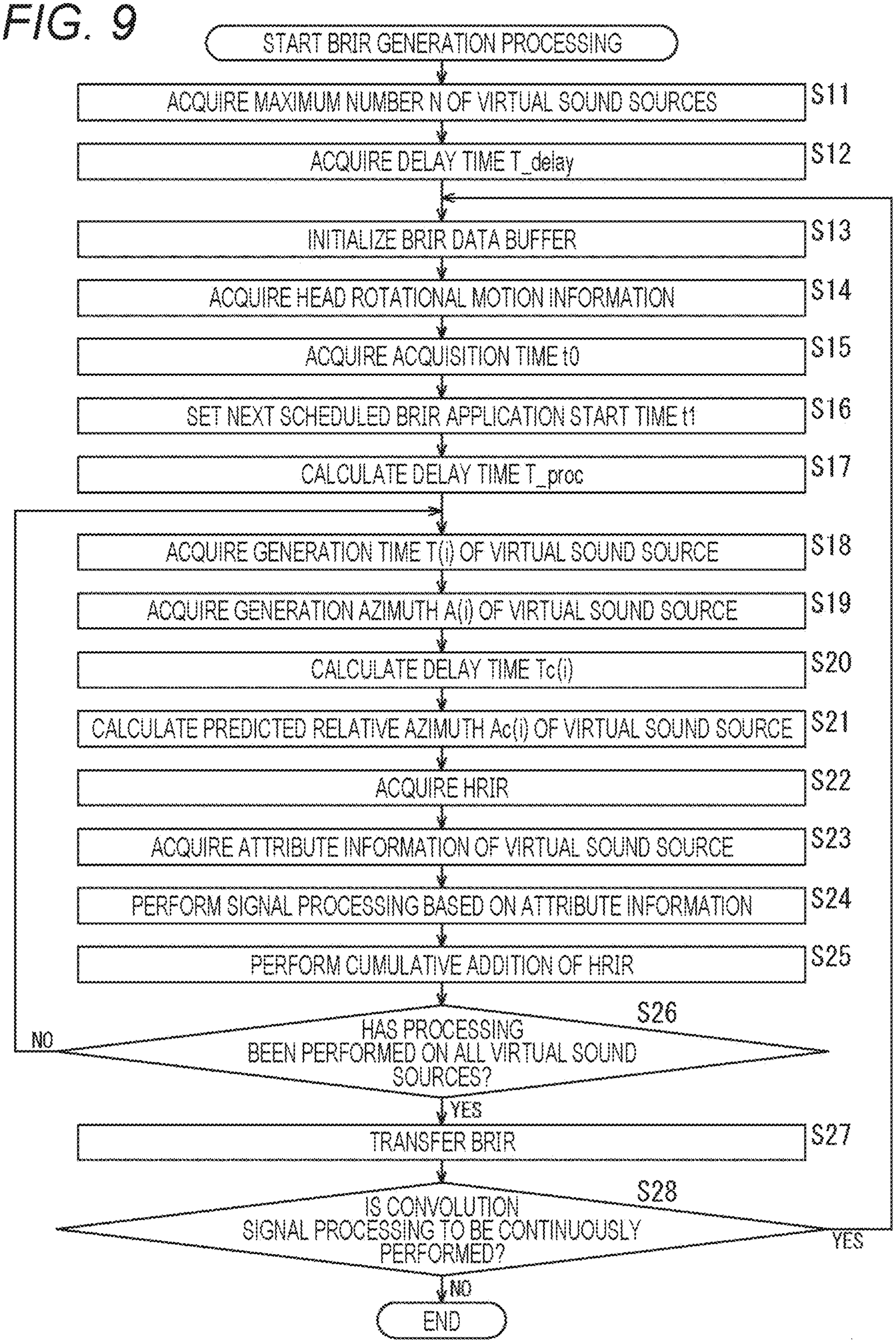
FIG. 9 is a flowchart illustrating BRIR generation processing.

When an input signal starts to be supplied, the signal processing device 11 performs BRIR generation processing, generates a BRIR, performs convolution signal processing, and outputs an output signal. The BRIR generation processing by the signal processing device 11 will be described below with reference to a flowchart in FIG. 9.

In step S11, the BRIR generation processing unit 21 acquires the maximum number N of virtual sound sources in the RIR database from the RIR database memory 33, and supplies the maximum number N of virtual sound sources to the virtual sound source counter 32 to cause the virtual sound source counter 32 to start outputting a count value.

When the count value is supplied from the virtual sound source counter 32, the RIR database memory 33 reads, from the RIR database, and outputs the generation time T(i), the generation azimuth A(i), and the attribute information of the virtual sound source i indicated by the count value for each channel of the input signal.

In step S12, the relative azimuth prediction unit 34 acquires the delay time T_delay determined in advance.

In step S13, the left ear cumulative addition unit 37 and the right ear cumulative addition unit 38 initialize, to 0, values held in BRIR data buffers of the M channels that are held.

In step S14, the sensor unit 31 acquires head rotational motion information, and supplies the head rotational motion information to the relative azimuth prediction unit 34.

For example, in step S14, information indicating a movement of the listener's head including the head angle information As, the head angular velocity information Bs, and the head angular acceleration information Cs is acquired as the head rotational motion information.

In step S15, the relative azimuth prediction unit 34 acquires the head angle information As in the sensor unit 31, that is, acquisition time t0 of the head rotational motion information.

In step S16, the relative azimuth prediction unit 34 sets a scheduled application start time of the next BRIR, that is, scheduled start time t1 of convolution between the BRIR and the input signal.

In step S17, the relative azimuth prediction unit 34 calculates the delay time T_proc=t1-t0 on the basis of acquisition time t0 and time t1.

In step S18, the relative azimuth prediction unit 34 acquires the generation time T(i) of the virtual sound source i output from the RIR database memory 33.

Furthermore, in step S19, the relative azimuth prediction unit 34 acquires the generation azimuth A(i) of the virtual sound source i output from the RIR database memory 33.

In step S20, the relative azimuth prediction unit 34 calculates Equation (1) described above on the basis of the delay time T_delay acquired in step S12, the delay time T_proc obtained in step S17, and the generation time T(i) acquired in step S18 to calculate the delay time Tc(i) of the virtual sound source i.

In step S21, the relative azimuth prediction unit 34 calculates the predicted relative azimuth Ac(i) of the virtual sound source i and supplies the predicted relative azimuth Ac(i) to the HRIR database memory 35.

For example, in step S21, Equation (2) described above is calculated on the basis of the delay time Tc(i) calculated in step S20, the head rotational motion information acquired in step S14, and the generation azimuth A(i) acquired in step S19, and thus the predicted relative azimuth Ac(i) is calculated.

Furthermore, the HRIR database memory 35 reads, from the HRIR database, and outputs the HRIR in the direction indicated by the predicted relative azimuth Ac(i) supplied from the relative azimuth prediction unit 34. With this arrangement, the HRIR of each of the left and right ears in accordance with the predicted relative azimuth Ac(i) indicating the positional relationship between the listener and the virtual sound source i in consideration of the rotation of the head is output.

In step S22, the attribute application unit 36 acquires the HRIR for the left ear and the HRIR for the right ear in accordance with the predicted relative azimuth Ac(i) output from the HRIR database memory 35.

In step S23, the attribute application unit 36 acquires the attribute information of the virtual sound source i output from the RIR database memory 33.

In step S24, the attribute application unit 36 performs signal processing based on the attribute information acquired in step S23 on the HRIR for the left ear and the HRIR for the right ear acquired in step S22.

For example, in step S24, as the signal processing based on the attribute information, gain calculation (calculation for gain correction) is performed for the HRIRs on the basis of gain information determined by the intensity of the sound of the virtual sound source i as the attribute information.

Furthermore, for example, as the signal processing based on the attribute information, digital filter processing or the like is performed for the HRIRs on the basis of a filter determined by a frequency characteristic as the attribute information.

The attribute application unit 36 supplies the HRIR for the left ear obtained by the signal processing to the left ear cumulative addition unit 37, and supplies the HRIR for the right ear to the right ear cumulative addition unit 38.

In step S25, the left ear cumulative addition unit 37 and the right ear cumulative addition unit 38 perform cumulative addition of the HRIRs on the basis of the generation time T(i) of the virtual sound source i supplied from the RIR database memory 33.

Specifically, the left ear cumulative addition unit 37 cumulatively adds the HRIR for the left ear obtained in step S24 to a value stored in the data buffer provided in the left ear cumulative addition unit 37, that is, to the HRIR for the left ear that has been obtained by the cumulative addition so far.

At this time, the HRIR for the left ear obtained in step S24 and the value already stored in the data buffer are added so that the position of an address corresponding to the generation time T(i) in the data buffer is located at the beginning of the HRIR for the left ear to be cumulatively added, and the value obtained as a result is written back to the data buffer.

Similarly to the case of the left ear cumulative addition unit 37, the right ear cumulative addition unit 38 also cumulatively adds the HRIR for the right ear obtained in step S24 to a value stored in the data buffer provided in the right ear cumulative addition unit 38.

The processing in steps S18 to S25 described above is performed for each channel of the input signal supplied to the convolution signal processing unit 22.

In step S26, the BRIR generation processing unit 21 determines whether or not the processing has been performed on all the N virtual sound sources.

For example, in step S26, in a case where the above-described processing in steps S18 to S25 has been performed on virtual sound sources 0 to N-1 corresponding to the count values 1 to N output from the virtual sound source counter 32, it is determined that the processing has been performed on all the virtual sound sources.

In a case where it is determined in step S26 that the processing has not been performed on all the virtual sound sources, the processing returns to step S18, and the above-described processing is repeated.

In this case, when a count value is output from the virtual sound source counter 32 and the above-described processing in steps S18 to S25 is performed for the virtual sound source i indicated by the count value, the next count value is output from the virtual sound source counter 32.

Then, in steps S18 to S25 to be performed next, the processing for the virtual sound source i indicated by the count value is performed.

Furthermore, in a case where it is determined in step S26 that the processing has been performed on all the virtual sound sources, the HRIRs of all the virtual sound sources have been added (combined) and a BRIR has been obtained. Thereafter, the processing proceeds to step S27.

In step S27, the left ear cumulative addition unit 37 and the right ear cumulative addition unit 38 transfer (supply) the BRIRs held in the data buffers to the left ear convolution signal processing unit 41 and the right ear convolution signal processing unit 42.

Then, the left ear convolution signal processing unit 41 convolves the supplied input signal and the BRIR for the left ear supplied from the left ear cumulative addition unit 37 at a predetermined timing, and supplies an output signal for the left ear obtained as a result to the addition unit 43. At this time, overlap-add of output signal blocks is performed as appropriate, and an output signal frame is generated.

Furthermore, the addition unit 43 adds the output signals supplied from the left ear convolution signal processing units 41, and outputs a final output signal for the left ear obtained as a result.

Similarly, the right ear convolution signal processing unit 42 convolves the supplied input signal and the BRIR for the right ear supplied from the right ear cumulative addition unit 38 at a predetermined timing, and supplies an output signal for the right ear obtained as a result to the addition unit 44.

The addition unit 44 adds the output signals supplied from the right ear convolution signal processing units 42, and outputs a final output signal for the right ear obtained as a result.

In step S28, the BRIR generation processing unit 21 determines whether or not the convolution signal processing is to be continuously performed.

For example, in step S28, in a case such as a case where the listener or the like has given an instruction to end the processing or a case where the convolution signal processing has been performed on all the frames of the input signal, it is determined that the convolution signal processing is to be ended, that is, the convolution signal processing is not to be continuously performed.

In a case where it is determined in step S28 that the convolution signal processing is to be continuously performed, thereafter, the processing returns to step S13, and the above-described processing is repeated.

That is, for example, in a case where the convolution signal processing is to be continuously performed, the virtual sound source counter 32 newly outputs count values in order from 1 to N, and a BRIR is generated (updated) in accordance with the count values.

On the other hand, in a case where it is determined in step S28 that the convolution signal processing is not to be continuously performed, the BRIR generation processing ends.

As described above, the signal processing device 11 calculates the predicted relative azimuth Ac(i) using not only the head angle information As but also the head angular velocity information Bs and the head angular acceleration information Cs, and generates a BRIR in accordance with the predicted relative azimuth Ac(i). In this way, it is possible to prevent generation of distortion of the sound space and achieve more accurate sound reproduction.

Here, the effect of reducing a deviation of a relative azimuth of a virtual sound source with respect to a listener in the present technology will be described with reference to FIGS. 10 to 12.

Figure 10:
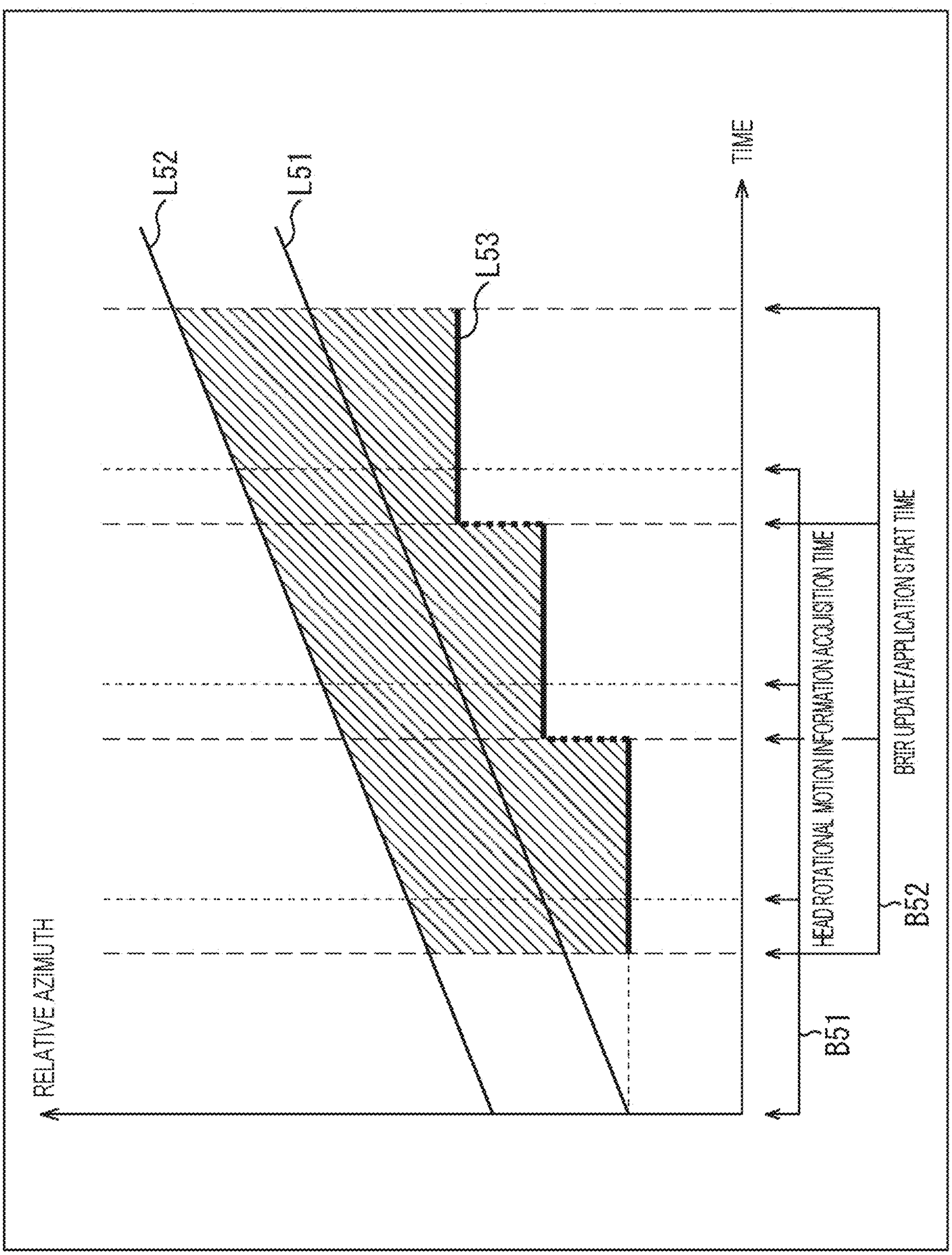
FIG. 10 is a diagram illustrating an effect of reducing the deviation of the relative azimuth of the virtual sound source.
Figure 11:
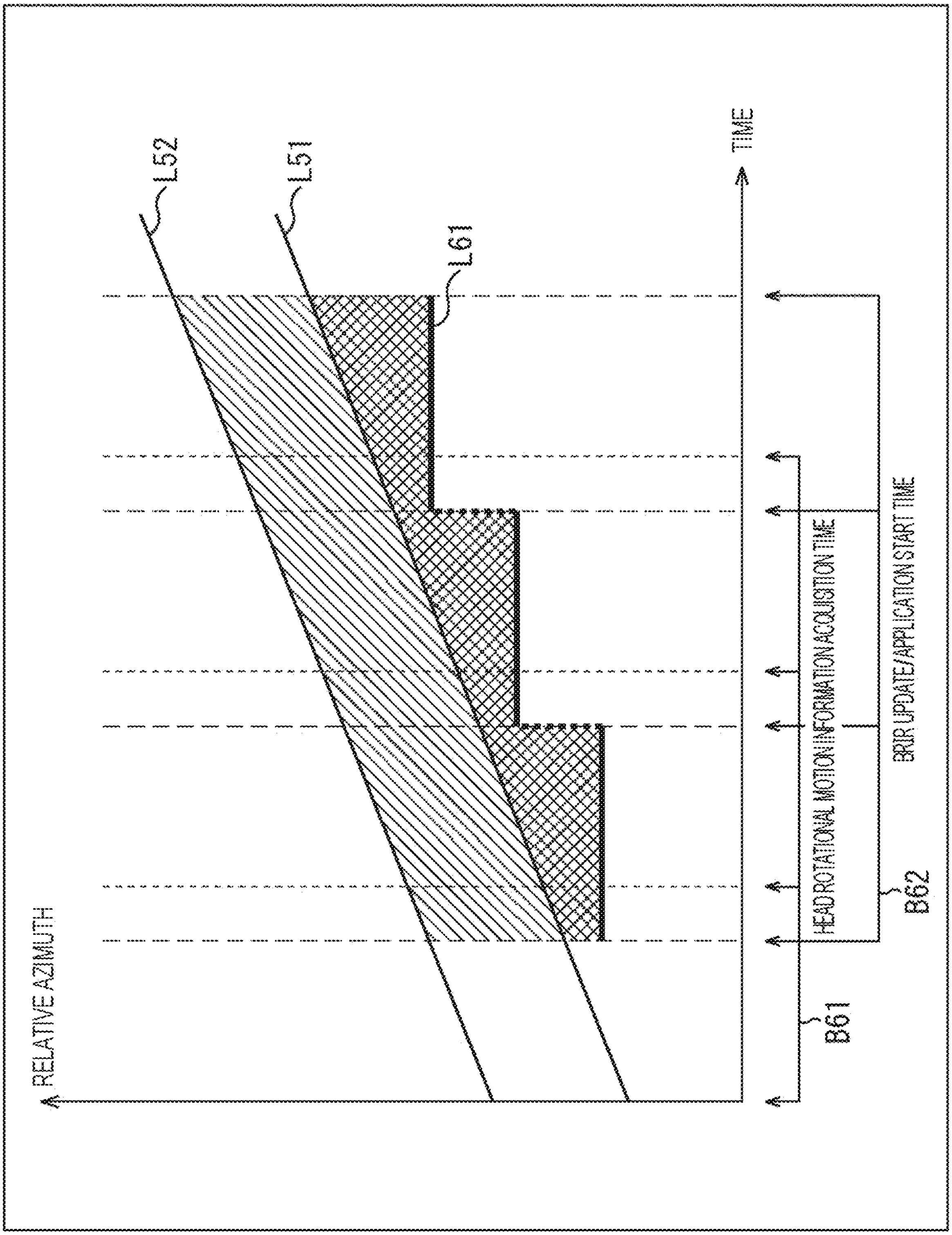
FIG. 11 is a diagram illustrating an effect of reducing the deviation of the relative azimuth of the virtual sound source.
Figure 12:
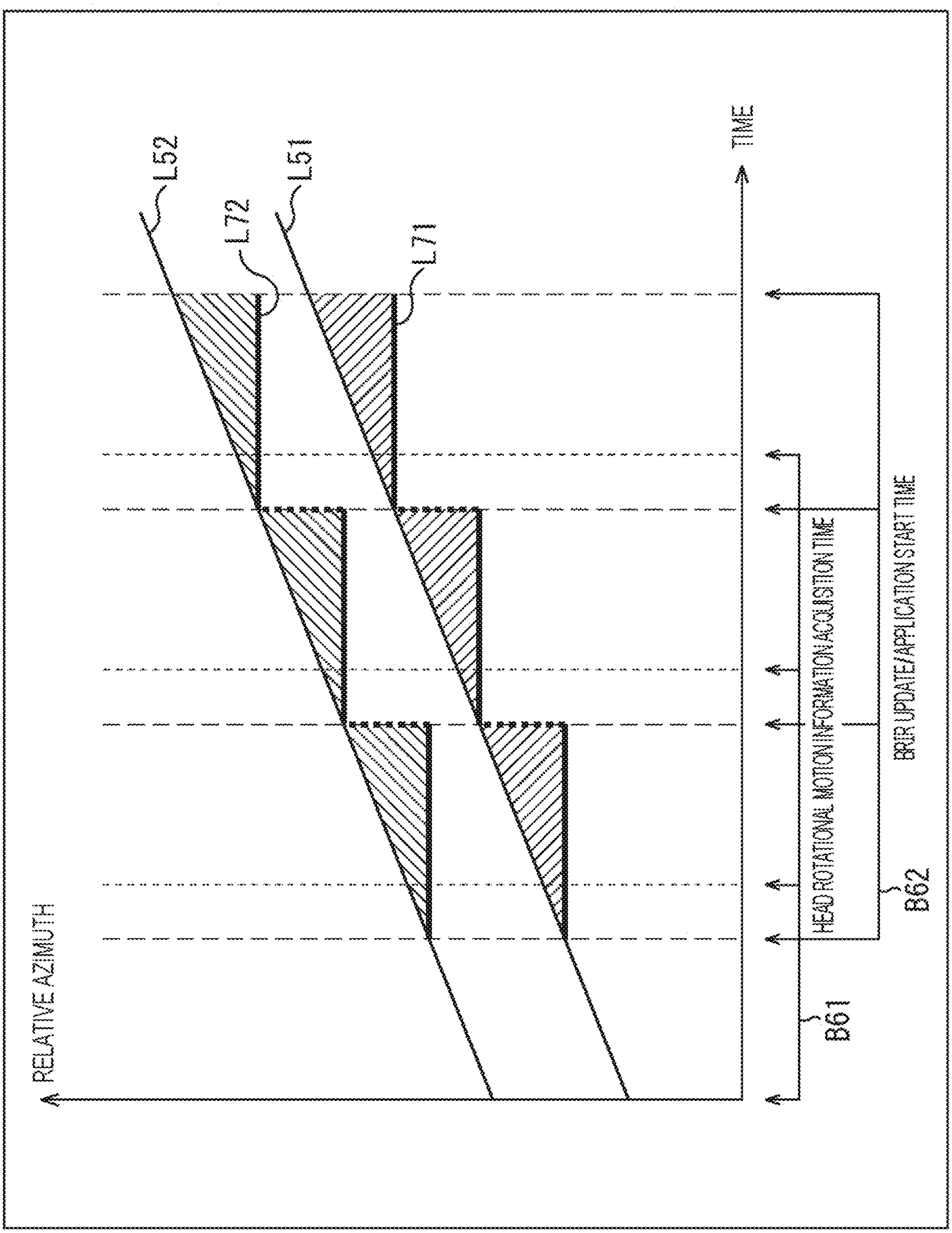
FIG. 12 is a diagram illustrating an effect of reducing the deviation of the relative azimuth of the virtual sound source.

Note that, in FIGS. 10 to 12, the same reference numerals are given to portions that correspond to each other, and the description thereof will be omitted as appropriate. Furthermore, in FIGS. 10 to 12, the vertical axis indicates the relative azimuth of the virtual sound source with respect to the listener, and the horizontal axis indicates the time.

Furthermore, here, a case where the present technology is applied to the example illustrated in FIG. 3 will be described. That is, the deviations of the relative azimuths of the virtual sound source AD0 (ID=0) and the virtual sound source ADn (ID=n) with respect to the listener U11 reproduced in sound VR or sound AR when the listener U11 moves the head at a constant angular velocity in the direction indicated by the arrow W11, that is, a temporal transition of a relative azimuth error, will be described.

First, FIG. 10 illustrates the deviations of the relative azimuths when the sounds of the virtual sound source AD0 and the virtual sound source ADn are reproduced by a general head tracking method.

Here, the head angle information indicating the head azimuth of the listener U11, that is, the head rotational motion information is acquired, and the BRIR is updated (generated) on the basis of the head angle information.

In particular, an arrow B51 indicates the time at which the head angle information is acquired, and an arrow B52 indicates the time at which the BRIR is updated and starts to be applied.

Furthermore, in FIG. 10, a straight line L51 indicates an actual correct relative azimuth at each time of the virtual sound source AD0 with respect to the listener U11. Furthermore, a straight line L52 indicates an actual correct relative azimuth at each time of the virtual sound source ADn with respect to the listener U11.

On the other hand, a polygonal line L53 indicates the relative azimuth of the virtual sound source AD0 and the virtual sound source ADn with respect to the listener U11 at each time, which are reproduced by sound reproduction.

In FIG. 10, it can be seen that a deviation indicated by a hatched area is generated at each time between the actual correct relative azimuth and the relative azimuths of the virtual sound source AD0 and the virtual sound source ADn reproduced by sound reproduction.

Thus, for example, in the signal processing device 11, when only the azimuth deviation A1 illustrated in FIG. 3, that is, only the distortion depending on the delay time T_proc and the delay time T_delay is corrected, the deviations of the relative azimuths of the virtual sound source AD0 and the virtual sound source ADn are as illustrated in FIG. 11.

In the example in FIG. 11, the head angle information As and the like, that is, the head rotational motion information is acquired at each time indicated by an arrow B61, and the BRIR is updated and starts to be applied at each time indicated by an arrow B62.

In this example, a polygonal line L61 indicates the relative azimuth of the virtual sound source AD0 and the virtual sound source ADn with respect to the listener U11 at each time reproduced by sound reproduction based on the output signal in a case where the distortion depending on the delay time T_proc and the delay time T_delay is corrected by the signal processing device 11.

Furthermore, a hatched area at each time indicates a deviation between the relative azimuths of the virtual sound source AD0 and the virtual sound source ADn reproduced by sound reproduction and the actual correct relative azimuth.

The polygonal line L61 is at a position closer to the straight line L51 and the straight line L52 at each time as compared with the case of the polygonal line L53 in FIG. 10, and it can be seen that the deviations of the relative azimuths of the virtual sound source AD0 and the virtual sound source ADn are smaller.

In this way, by correcting the distortion depending on the delay time T_proc and the delay time T_delay, it is possible to reduce the deviation of the relative azimuth and achieve more correct sound reproduction.

However, in the example in FIG. 11, the distance from the virtual sound source to the listener U11, that is, the azimuth deviation A2 in FIG. 3 depending on the propagation delay of the sound of the virtual sound source is not corrected.

In FIG. 11, as can be seen from the fact that the deviation of the relative azimuth of the virtual sound source ADn is larger than that of the virtual sound source AD0, the deviation of the relative azimuth becomes larger for a virtual sound source located farther from the listener U11.

On the other hand, in the signal processing device 11, not only the azimuth deviation A1 illustrated in FIG. 3 but also the azimuth deviation A2 is corrected, and this allows for a reduction in the deviation of the relative azimuth regardless of the position of the virtual sound source as illustrated in FIG. 12.

In this example, a polygonal line L71 indicates the relative azimuth of the virtual sound source AD0 with respect to the listener U11 at each time reproduced by sound reproduction based on the output signal in a case where the distortion depending on the delay time T_proc and the delay time T_delay and the distortion depending on the distance to the virtual sound source are corrected by the signal processing device 11.

Furthermore, a hatched area between the straight line L51 and the polygonal line L71 indicates a deviation between the relative azimuth of the virtual sound source AD0 reproduced by sound reproduction and the actual correct relative azimuth.

Similarly, a polygonal line L72 indicates the relative azimuth of the virtual sound source ADn with respect to the listener U11 at each time reproduced by sound reproduction based on the output signal in a case where the distortion depending on the delay time T_proc and the delay time T_delay and the distortion depending on the distance to the virtual sound source are corrected by the signal processing device 11.

Furthermore, a hatched area between the straight line L52 and the polygonal line L72 indicates a deviation between the relative azimuth of the virtual sound source ADn reproduced by sound reproduction and the actual correct relative azimuth.

In this example, the effect of improving (effect of reducing) the deviation of the relative azimuth at each time is equivalent regardless of the distance from the listener U11 to the virtual sound source, that is, for both the virtual sound source AD0 and the virtual sound source ADn. Furthermore, it can be seen that the deviations of the relative azimuths are further smaller than those in the example in FIG. 11.

Note that, as the deviations of the relative azimuths of the virtual sound source AD0 and the virtual sound source ADn, a deviation associated with a frequency of BRIR update being intermittent remains, but this cannot be improved in principle other than by increasing the frequency of BRIR update. Therefore, in the present technology, the deviation of the relative azimuth of a virtual sound source is minimized.

As described above, instead of holding a BRIR determined in advance as in a general head tracking, the present technology uses a BRIR rendering method to independently hold the generation azimuth and the generation time of each virtual sound source, and BRIRs are successively combined with the use of head rotational motion information and prediction of the relative azimuth.

Therefore, only BRIRs in a state determined in advance such as the entire circumference in the horizontal direction on the premise that the head remains stationary have been able to be used in a general head tracking, but the present technology makes it possible to obtain an appropriate BRIR for a variety of motions of the listener's head such as the azimuth and the angular velocity of the head. With this arrangement, the distortion of the sound space can be corrected, and more accurate sound reproduction can be achieved.

In particular, in the present technology, a predicted relative azimuth is calculated with the use of not only the head angle information but also the head angular velocity information and the head angular acceleration information, and a BRIR is generated in accordance with the predicted relative azimuth. This makes it possible to appropriately correct the deviation of the relative azimuth associated with a head motion that changes in accordance with the distance from the listener to the virtual sound source. With this arrangement, the distortion of the sound space during a head motion can be corrected, and more accurate sound reproduction can be achieved.

Configuration Example of Computer

Meanwhile, the series of pieces of processing described above can be executed not only by hardware but also by software. In a case where the series of pieces of processing is executed by software, a program constituting the software is installed on a computer. Here, the computer includes a computer incorporated in dedicated hardware, or a general-purpose personal computer capable of executing various functions with various programs installed therein, for example.

Figure 13:
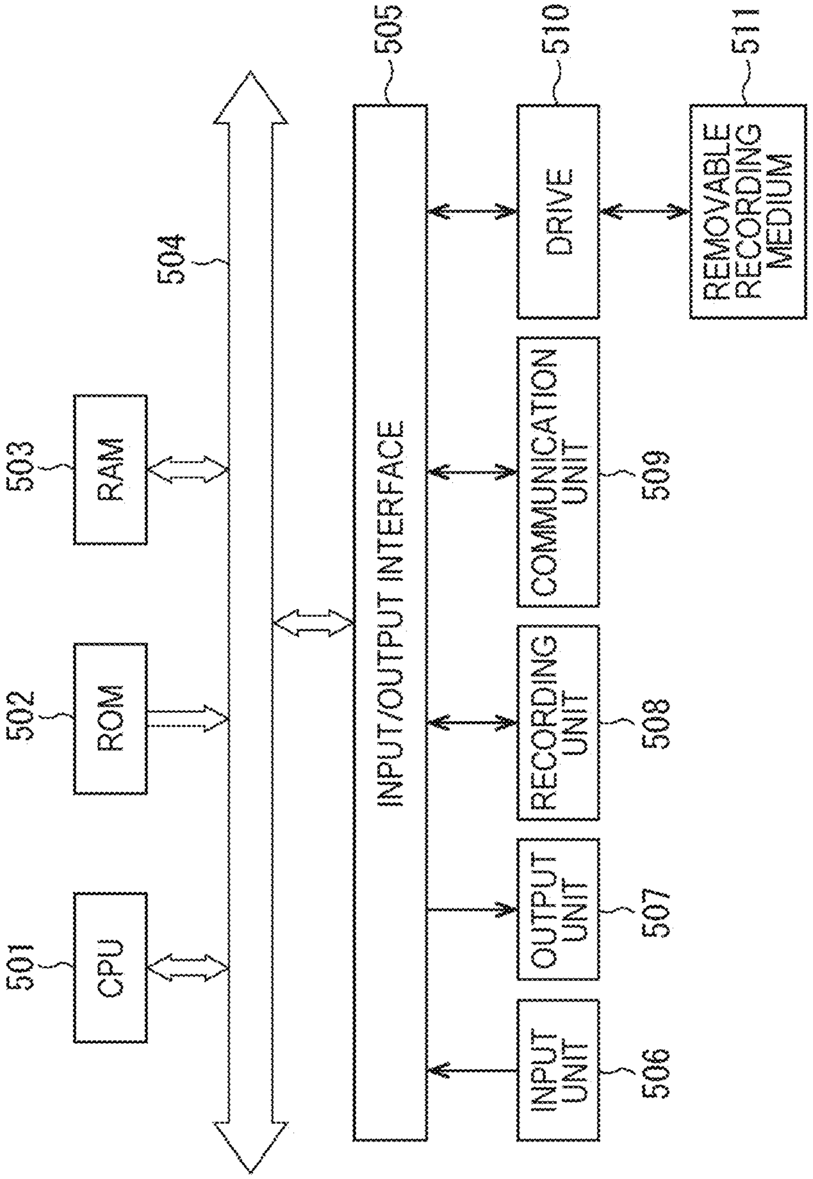
FIG. 13 is a diagram illustrating a configuration example of a computer.

FIG. 13 is a block diagram illustrating a configuration example of hardware of a computer that executes the series of pieces of processing described above in accordance with a program.

In the computer, a central processing unit (CPU) 501, a read only memory (ROM) 502, and a random access memory (RAM) 503 are connected to each other by a bus 504.

The bus 504 is further connected with an input/output interface 505. The input/output interface 505 is connected with an input unit 506, an output unit 507, a recording unit 508, a communication unit 509, and a drive 510.

The input unit 506 includes a keyboard, a mouse, a microphone, an imaging element, or the like. The output unit 507 includes a display, a speaker, or the like. The recording unit 508 includes a hard disk, a non-volatile memory, or the like. The communication unit 509 includes a network interface or the like. The drive 510 drives a removable recording medium 511 such as a magnetic disk, an optical disk, a magneto-optical disk, or a semiconductor memory.

To perform the series of pieces of processing described above, the computer having a configuration as described above causes the CPU 501 to, for example, load a program recorded in the recording unit 508 into the RAM 503 via the input/output interface 505 and the bus 504 and then execute the program.

The program to be executed by the computer (CPU 501) can be provided by, for example, being recorded on the removable recording medium 511 as a package medium or the like. Furthermore, the program can be provided via a wired or wireless transmission medium such as a local area network, the Internet, or digital satellite broadcasting.

Inserting the removable recording medium 511 into the drive 510 allows the computer to install the program into the recording unit 508 via the input/output interface 505. Furthermore, the program can be received by the communication unit 509 via a wired or wireless transmission medium and installed into the recording unit 508. In addition, the program can be installed in advance in the ROM 502 or the recording unit 508.

Note that the program to be executed by the computer may be a program that performs the pieces of processing in chronological order as described in the present specification, or may be a program that performs the pieces of processing in parallel or when needed, for example, when the processing is called.

Furthermore, embodiments of the present technology are not limited to the embodiment described above but can be modified in various ways within a scope of the present technology.

For example, the present technology can have a cloud computing configuration in which a plurality of devices shares one function and collaborates in processing via a network.

Furthermore, each step described in the flowcharts described above can be executed by one device or can be shared by a plurality of devices.

Moreover, in a case where a plurality of pieces of processing is included in one step, the plurality of pieces of processing included in that one step can be executed by one device or can be shared by a plurality of devices.

Moreover, the present technology can also have the following configurations.

(1)

A signal processing device including:

a relative azimuth prediction unit configured to predict, on the basis of a delay time in accordance with a distance from a virtual sound source to a listener, a relative azimuth of the virtual sound source when a sound of the virtual sound source reaches the listener; and a BRIR generation unit configured to acquire a head-related transfer function of the relative azimuth for each one of a plurality of the virtual sound sources and generate a BRIR on the basis of a plurality of the acquired head-related transfer functions.

(2)

The signal processing device according to (1), further including:

a convolution signal processing unit configured to generate an output signal for reproducing the sounds of the plurality of the virtual sound sources by performing convolution signal processing of an input signal and the BRIR.

(3)

The signal processing device according to (2), in which the relative azimuth prediction unit predicts the relative azimuth on the basis of a delay time due to the generation of the BRIR and the convolution signal processing.

(4)

The signal processing device according to any one of (1) to (3), in which the relative azimuth prediction unit predicts the relative azimuth on the basis of information indicating a movement of the listener's head.

(5)

The signal processing device according to (4), in which the information indicating the movement of the listener's head is at least one of angle information, angular velocity information, or angular acceleration information of the listener's head.

(6)

The signal processing device according to any one of (1) to (5), in which the relative azimuth prediction unit predicts the relative azimuth on the basis of a generation azimuth of the virtual sound source.

(7)

The signal processing device according to any one of (1) to (6), in which the BRIR generation unit generates the BRIR by adding a transmission characteristic for the virtual sound source to the head-related transfer function for each one of the plurality of the virtual sound sources, and combining the head-related transfer functions to which the transmission characteristics have been added, the head-related transfer functions being obtained one for each one of the plurality of the virtual sound sources.

(8)

The signal processing device according to (7), in which the BRIR generation unit adds the transmission characteristic to the head-related transfer function by performing gain correction in accordance with intensity of the sound of the virtual sound source or filter processing in accordance with a frequency characteristic of the virtual sound source.

(9)

A signal processing method including:

by a signal processing device, predicting, on the basis of a delay time in accordance with a distance from a virtual sound source to a listener, a relative azimuth of the virtual sound source when a sound of the virtual sound source reaches the listener; and acquiring a head-related transfer function of the relative azimuth for each one of a plurality of the virtual sound sources and generating a BRIR on the basis of a plurality of the acquired head-related transfer functions.

(10)

A program for causing a computer to execute processing including steps of:

predicting, on the basis of a delay time in accordance with a distance from a virtual sound source to a listener, a relative azimuth of the virtual sound source when a sound of the virtual sound source reaches the listener; and acquiring a head-related transfer function of the relative azimuth for each one of a plurality of the virtual sound sources and generating a BRIR on the basis of a plurality of the acquired head-related transfer functions.

REFERENCE SIGNS LIST

11 Signal processing device
21 BRIR generation processing unit
22 Convolution signal processing unit
31 Sensor unit
33 RIR database memory
34 Relative azimuth prediction unit
35 HRIR database memory
36 Attribute application unit
37 Left ear cumulative addition unit
38 Right ear cumulative addition unit
41-1 to 41-M, 41 Left ear convolution signal processing unit
42-1 to 42-M, 42 Right ear convolution signal processing unit

The invention claimed is:

1. A signal processing device, comprising:

a relative azimuth prediction unit configured to predict, based on a first delay time, a relative azimuth of a virtual sound source when a sound of the virtual sound source reaches a listener, wherein the first delay time is based on a distance from the virtual sound source to the listener; and a binaural-room impulse response (BRIR) generation unit configured to:

acquire a head-related transfer function of the relative azimuth for each one of a plurality of virtual sound sources, wherein the plurality of virtual sound sources comprises the virtual sound source; and generate a BRIR based on a plurality of head-related transfer functions, wherein the plurality of head-related transfer functions comprises the acquired head-related transfer function.

2. The signal processing device according to claim 1, further comprising:

a convolution signal processing unit configured to generate an output signal for reproduction of sounds of the plurality of virtual sound sources by a convolution signal processing operation of an input signal and the BRIR.

3. The signal processing device according to claim 2, wherein the relative azimuth prediction unit is further configured to predict the relative azimuth based on a second delay time due to the generation of the BRIR and the convolution signal processing operation.

4. The signal processing device according to claim 1, wherein the relative azimuth prediction unit is further configured to predict the relative azimuth based on information indicating a movement of a head of the listener.

5. The signal processing device according to claim 4, wherein the information indicating the movement of the head of the listener is at least one of angle information, angular velocity information, or angular acceleration information of the head of the listener.

6. The signal processing device according to claim 1, wherein the relative azimuth prediction unit is further configured to predict the relative azimuth based on a generation azimuth of the virtual sound source.

7. The signal processing device according to claim 1, wherein the BRIR generation unit is further configured to generate the BRIR by addition of a transmission characteristic for the virtual sound source to the head-related transfer function for each one of the plurality of virtual sound sources, and combination of the head-related transfer function to which the transmission characteristic characteristics-have been added, for the plurality of virtual sound sources.

8. The signal processing device according to claim 7, wherein the BRIR generation unit is further configured to add the transmission characteristic to the head-related transfer function by one of a gain correction operation or a filter processing operation, the gain correction operation is based on intensity of the sound of the virtual sound source, and the filter processing operation is based on a frequency characteristic of the virtual sound source.

9. A signal processing method, comprising:

by a signal processing device:

predicting, based on a delay time, a relative azimuth of a virtual sound source when a sound of the virtual sound source reaches a listener, wherein the delay time is based on a distance from the virtual sound source to the listener;

acquiring a head-related transfer function of the relative azimuth for each one of a plurality of virtual sound sources, wherein the plurality of virtual sound sources comprises the virtual sound source; and generating a BRIR based on a plurality of head-related transfer functions, wherein the plurality of head-related transfer functions comprises the acquired head-related transfer function.

10. A non-transitory computer-readable medium having stored thereon, computer-executable instructions which, when executed by a processor of a computer, cause the computer to execute operations, the operations:

predicting, based on a delay time, a relative azimuth of a virtual sound source when a sound of the virtual sound source reaches a listener, wherein the delay time is based on a distance from the virtual sound source to the listener;

acquiring a head-related transfer function of the relative azimuth for each one of a plurality of virtual sound sources, wherein the plurality of virtual sound sources comprises the virtual sound source; and generating a BRIR based on a plurality of head-related transfer functions, wherein the plurality of head-related transfer functions comprises the acquired head-related transfer function.

* * * * *